US011537830B2

(12) United States Patent
Sinha et al.

(10) Patent No.: US 11,537,830 B2
(45) Date of Patent: Dec. 27, 2022

(54) METHODS AND SYSTEMS FOR A COMBINED TRANSACTION BY AN ASSIGNEE ON BEHALF OF ONE OR MORE USERS

(71) Applicant: MASTERCARD INTERNATIONAL INCORPORATED, Purchase, NY (US)

(72) Inventors: Ajay Sinha, Pune (IN); Bhargav Jagdishchandra Modi, Ahmedabad (IN); Ajit Karnik, Pune (IN); Naveen Kumar Gupta, Pune (IN); Deepa Swami, Pune (IN); Saurabh Banga, Pune (IN); Dipali Pathrabe, Pune (IN); Namod Chandrashekar Kunder, Mumbai (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 288 days.

(21) Appl. No.: 16/696,471

(22) Filed: Nov. 26, 2019

(65) Prior Publication Data

US 2020/0167622 A1 May 28, 2020

(30) Foreign Application Priority Data

Nov. 27, 2018 (SG) .......................... 10201810608V

(51) Int. Cl.
 *G06K 19/06* (2006.01)
 *G06Q 20/32* (2012.01)
 *G06Q 20/40* (2012.01)
(52) U.S. Cl.
 CPC ... *G06K 19/06037* (2013.01); *G06Q 20/3274* (2013.01); *G06Q 20/40145* (2013.01)
(58) Field of Classification Search
 None
 See application file for complete search history.

(56) References Cited

U.S. PATENT DOCUMENTS 7,117,172 B1  10/2006  Black
7,222,345 B2   5/2007  Gray et al.
(Continued)

OTHER PUBLICATIONS

"Mukund Sarma, Second Level Authentication Using QR codes, Nov. 2, 2013, International Journal of Computer and Internet Security, p. 46-47" (Year: 2013).*

(Continued)

*Primary Examiner* — Kito R Robinson
*Assistant Examiner* — Toan Duc Bui
(74) *Attorney, Agent, or Firm* — Armstrong Teasdale LLP

(57) ABSTRACT

Embodiments provide methods, and server systems for performing a combined transaction for one or more scheduled transactions. The method is configured to generate one or more machine readable codes for the one or more scheduled transactions through a first transaction terminal, where each machine readable code is associated with a scheduled transaction of the one or more scheduled transactions. Further, the method includes generating a composite machine readable code based on the one or more machine readable codes. The generation of composite machine readable code further include, at least one authentication attribute of an assignee. The method, furthermore, includes receiving a second transaction request through a second transaction terminal. The second transaction request includes the composite machine readable code. The method facilitates the combined transaction based on authentication of the composite machine readable code, wherein the combined transaction is associated with the one or more scheduled transactions.

18 Claims, 14 Drawing Sheets

(56) References Cited

U.S. PATENT DOCUMENTS

| | | | |
|---|---|---|---|
| 8,401,968 B1 | 3/2013 | Schattauer et al. | |
| 10,255,419 B1* | 4/2019 | Kragh | H04L 9/3297 |
| 10,387,876 B1 | 8/2019 | Buentello et al. | |
| 10,445,990 B2 | 10/2019 | Chebrole et al. | |
| 2004/0030657 A1 | 2/2004 | Holm-Blagg et al. | |
| 2004/0078742 A1 | 4/2004 | Emek et al. | |
| 2004/0215566 A1 | 10/2004 | Meurer | |
| 2009/0081989 A1 | 3/2009 | Wuhrer | |
| 2013/0110607 A1* | 5/2013 | Basmajian | G06Q 30/0234 |
| | | | 705/14.26 |
| 2014/0074575 A1 | 3/2014 | Rappoport | |
| 2016/0019510 A1* | 1/2016 | Guntupalli | G06Q 20/1085 |
| | | | 705/43 |
| 2017/0076274 A1 | 3/2017 | Royyuru et al. | |
| 2017/0308847 A1* | 10/2017 | Todd | G06Q 10/087 |
| 2018/0096323 A1* | 4/2018 | Baber | G06Q 20/4012 |
| 2018/0150833 A1 | 5/2018 | Carlson | |
| 2018/0158036 A1* | 6/2018 | Zhou | G06F 1/163 |
| 2018/0165663 A1* | 6/2018 | Naik | G06Q 20/3223 |
| 2019/0197610 A1* | 6/2019 | Guare | H04L 9/3228 |
| 2021/0174347 A1* | 6/2021 | Rose | H04L 63/0428 |
| 2021/0176340 A1* | 6/2021 | Rose | G06Q 20/3274 |
| 2021/0319452 A1* | 10/2021 | Ramanathan | G06Q 20/3272 |

OTHER PUBLICATIONS

Indian First Examination Report, Application No. 201914037908, dated Jun. 28, 2021, 6 pps.

* cited by examiner

METHODS AND SYSTEMS FOR A COMBINED TRANSACTION BY AN ASSIGNEE ON BEHALF OF ONE OR MORE USERS

CROSS REFERENCE TO RELATED APPLICATIONS

This patent application claims priority to Singapore Patent Application No. 10201810608V filed on Nov. 27, 2018, the disclosure of which is incorporated by reference herein in its entirety as part of the present application.

BACKGROUND

The present disclosure relates to payment technology and, more particularly to, methods and systems for combined transaction such as group cash withdrawals by an assignee on behalf of multiple users using machine readable codes.

With the growth of population, especially in developing countries, bringing the growing population under a financial discipline is a challenging task. One of the ways of achieving financial discipline is by getting every unbanked resident across the world under a formal banking financial system. The process of including millions of unbanked people under formal financial system may be termed as 'financial inclusion'. One of the major challenges with financial inclusion is providing accessibility to a user account as per the user requirement. In certain locations, such as rural areas or countryside, there is a lack of infrastructure that prevents users from accessing their accounts as per their requirement. For example, a user from the rural region may not have access to an Automated Teller Machine (ATM) in the rural region to withdraw cash from the her/his account, whenever required. The user may have to travel to nearby sub-urban or urban location to visit an ATM. Similarly, defense personnel posted in action areas may not have easy access to an ATM terminal. Every time the defense personnel are in need of cash, they are required to travel miles to locate an ATM in a nearby region. In such scenarios, the travel might cost them a significant amount of time and money. In addition, sometimes this time and travel is wasted if it turns out that the ATM is either non-functional or out of cash. In some cases, if the user is a daily wage worker, she/he also loses the day's wage in the process.

In view of the above, presently, people from regions with no easy access to an ATM terminal, assign a person (also referred to as 'an assignee' or 'an authorized person') to withdraw cash on their behalf from the ATM terminal. The assignee may be anyone who visits a nearby ATM terminal and withdraw money from the ATM terminal on behalf of the user so that the user can avoid a trip to the ATM. However, requesting the authorized person to perform a transaction on behalf of the user may require the user to share credentials related to the user bank account with the authorized person. For example, the user may have to share the password, such as numeric pin and the account number with the authorized person along with a payment card of the user. The authorized person may carry a bunch of payment cards of multiple users to perform transaction/withdraw cash for multiple users from the nearby ATM terminal.

The sharing of credentials related to the user account is fraught with high fraud risk as all the credentials required to operate the user account is handed over to the authorized person. Additionally, majority of the population with lack of access to an ATM terminal are illiterate and face difficulty in handling the payment cards and remembering the passwords.

BRIEF DESCRIPTION

Various embodiments of the present disclosure provide systems, methods, electronic devices, and computer program products for performing a group transaction at a transaction terminal by an assignee, where the assignee is authorized at another transaction terminal by one or more users to perform the group transaction for one or more transactions.

An embodiment of the present disclosure provides a method. The method includes various steps, performed by an issuer server, in order to assist a user to access a user account. The method includes a step of receiving a first transaction request for performing a combined transaction for one or more scheduled transactions at a first transaction terminal. The first transaction terminal is configured to generate one or more machine readable codes corresponding to one or more scheduled transactions, where each machine readable code of the one or more machine readable codes is associated with a scheduled transaction of the one or more scheduled transactions. Further, the method includes a step of generating a composite machine readable code based on the one or more machine readable codes. The generation of composite machine readable code may further include, at least one authentication attribute of an assignee. The method, furthermore, includes a step of receiving a second transaction request for performing the combined transaction through a second transaction terminal. The second transaction request includes the composite machine readable code. Lastly, the method facilitates the combined transaction which based on authentication of the composite machine readable code, wherein the combined transaction is associated with the one or more scheduled transactions.

Another embodiment of the present disclosure provides a server system. The server system includes a memory and a processor. The memory includes stored instructions and the processor is configured to execute the stored instructions to cause the server system to execute a method. The method includes a step of receiving a first transaction request for performing a combined transaction for one or more scheduled transactions at a first transaction terminal. The first transaction terminal is configured to generate one or more machine readable codes for the one or more scheduled transactions, where each machine readable code of the one or more machine readable codes are associated with a scheduled transaction of the one or more scheduled transactions. Further, the method includes a step of generating a composite machine readable code based on the one or more machine readable codes. The generation of composite machine readable code may further include, at least one authentication attribute of an assignee. The method, furthermore, includes a step of receiving a second transaction request for performing the combined transaction through a second transaction terminal. The second transaction request includes the composite machine readable code. Lastly, the method facilitates the combined transaction which is based on authentication of the composite machine readable code, wherein the combined transaction includes dispensing money associated with the one or more scheduled transactions.

Further, one embodiment of the present disclosure provides a first transaction terminal. The first transaction terminal includes a database, a communication interface, and a processing module. The database is configured to store executable instructions and the communication interface is configured to receive a first transaction request for performing a combined transaction for one or more scheduled transactions. Further, the first transaction terminal includes the processing module which is electronically coupled to the user interface and the database. The processing module is designed to execute the executable instructions to perform at least one step of generating one or more machine readable codes for the one or more scheduled transactions, each machine readable code of the one or more machine readable codes associated with a scheduled transaction of the one or more scheduled transactions and generating a composite machine readable code based on the one or more machine readable codes and at least one authentication attribute of an assignee.

BRIEF DESCRIPTION OF THE DRAWINGS

For a more complete understanding of example embodiments of the present technology, reference is now made to the following descriptions taken in connection with the accompanying drawings in which.

Figure 1:
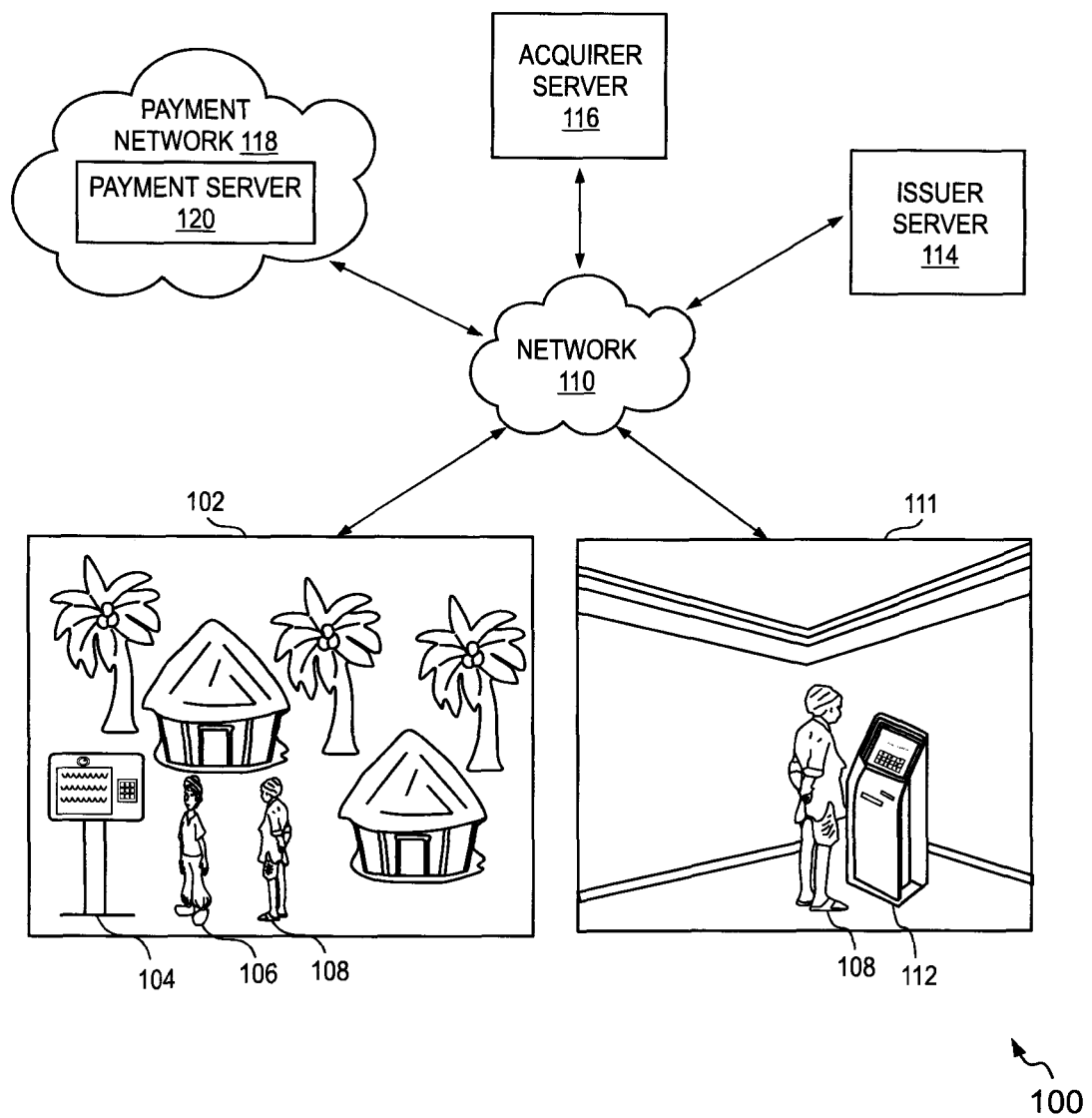
FIG. 1 illustrates an example representation of an environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer server" refers to a server installed at an issuer bank or a financial institute. The issuer bank or the financial institute is linked to one or more Automated Teller Machines (ATMs'). When a user walks in to an ATM, linked with the issuer bank, to withdraw cash from his/her user account, the ATM establishes the communication with the issuer bank as soon as the user provides his/her user account credentials. Intelligence required to verify user account and release the cash from the issuer bank is implemented in the issuer server. Typically, the user account is linked to a bank, for example an issuer bank. Examples of the user account include, but are not limited to a savings account, a credit account, a checking account, a digital wallet, and a virtual payment account. Each of the user account may be associated with an entity such as an individual person, a family, a commercial entity, a company, a corporation, a governmental entity, a non-profit organization, and the like.

The term "payment network" refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

The term "first transaction terminal" refers to a stationary automated machine installed locally at rural areas and is configured to generate a QR code/composite QR code in response to transaction request. The first transaction terminal may be accessed without a payment card. Further, the first transaction terminal may be in communication with at least one second transaction terminal and/or a server system so as to facilitate at least a part of the scheduled transaction. The term 'second transaction terminal' used throughout the disclosure refers to a transaction terminal such as but not limited to an Automated Teller Machine (ATM) installed at semi urban or urban areas, a Point of Sale (POS) terminal or an online merchant terminal for performing a transaction. The second transaction terminal as the ATM facilitates access to user account of respective user for performing a variety of financial transactions such as, cash withdrawal, deposits, check balances, and the like. The POS terminal and the online merchant terminal are examples of a merchant terminal where a user performs a transaction in exchange for goods/services availed from a respective merchant. Additionally or optionally, the second transaction terminal is configured to facilitate cardless transactions using biometric techniques for identifying and authenticating identity of the user. It shall be noted that the second transaction terminal may be remotely connected to one or more first transaction terminals so as to facilitate combined transactions of one or more scheduled transactions.

Overview

Various example embodiments of the present disclosure provide systems, methods, electronic devices, and computer program products for facilitating a group or combined transaction for one or more scheduled transactions. More specifically, techniques disclosed herein enable initiating one or more scheduled transactions for one or more users at a local terminal (also referred to as a 'first transaction terminal') and perform the combined transaction for the one or more scheduled transactions at a second transaction terminal. In some embodiments, the first transaction terminal and the second transaction terminal facilitate cardless transactions and use authentication techniques such as, biometric data and graphical codes for identifying user account details and authenticating transactions.

In many example scenarios, users at a remote village may not be able to travel to a location with an ATM terminal for performing transactions such as cash withdrawal or purchase of goods/services and they authorize other persons visiting the second transaction terminal and entrust them with their payments cards and passwords which may potentially result in fraudulent activities. To address such challenges, the present disclosure provides techniques for users at remote locations to securely authorize an assignee to complete their transactions. In an embodiment, a user may visit the first transaction terminal to authenticate and authorize the assignee for a scheduled transaction that the assignee may perform later at the second transaction terminal. The first transaction terminal is adapted to meet needs of the users at the remote location and may not require payment cards to access user account details of the users. In at least one example embodiment, the first transaction terminal captures biometric data, for example, fingerprint or facial features to identify the user and thereby the relevant account details. Further, the first transaction terminal authenticates identity of the users using one or more authentication techniques such as, by prompting the users to provide various biometric data and/or passwords. In at least one example embodiment, the passwords are graphical codes that the rural users may easily recollect to authenticate their identity. Moreover, the first transaction terminal and/or the second transaction terminal facilitate a graphical keypad for the users to provide the graphical code. Additionally, the first transaction terminal is configured to communicate in regional language with the rural users through the interactive display as well as through voice annunciation.

In at least one example embodiment, a user of the remote location/rural user may place a request for a machine readable code such as a QR code corresponding to the scheduled transaction at the first transaction terminal. It shall be noted that hereinafter for description purposes the machine readable code has been explained with reference to a QR code for the sake of simplicity. Accordingly, a composite machine readable code generated at the first transaction terminal by aggregating one or more machine readable codes and authentication attribute of the assignee is explained with an example of a composite QR code. However, it should be apparent to a person skilled in the art that embodiments of the disclosure can also be practiced with any other machine readable code. The user may be prompted by the first transaction terminal to provide a transaction amount for the scheduled transaction. When the user provides the transaction amount, the first transaction terminal generates the QR code for the scheduled transaction of the user at the first transaction terminal. The QR code includes user account details of the user, the transaction amount and a validity for the QR code. The user can now assign the QR code to another user (referred to as 'an assignee') who can perform the scheduled transaction on behalf of the user at the second transaction terminal.

In some example embodiments, the user may assign the scheduled transaction to the assignee by providing an authentication attribute of the assignee. For example, the assignee may be identified and verified at the first transaction terminal and the user may authenticate the assignee to perform the scheduled transaction. In such cases, a composite QR code is generated at the first transaction terminal. The composite QR code includes user account details of the user, transaction amount for the scheduled transaction, and an authentication attribute of the assignee. The authentication attribute may be any or combination of biometric data or password such as, a numerical code.

In some example embodiments, one or more users may place a first transaction request for a composite QR code. The first transaction request includes one or more QR codes corresponding to one or more scheduled transactions from one or more users and the authentication attribute of the assignee. The composite QR code can be assigned to the assignee, and the composite QR code enables the assignee to perform a combined transaction for the one or more scheduled transactions at the second transaction terminal. The one or more users may be identified and authenticated separately at the first transaction terminal. Then the QR codes corresponding to each scheduled transaction of the one or more scheduled transactions are provided by each user of the one or more users. The QR codes are tied with the authentication attribute of the assignee to generate the composite QR code at the first transaction terminal.

At the second transaction terminal, the assignee may place a second transaction request including the composite QR code for a combined transaction of the one or more scheduled transactions. The identity of the assignee may be authenticated, and he/she may provide the composite QR code at the second transaction terminal. Upon authentication, the second transaction terminal is configured to facilitate the combined transaction. The combined transaction may be a group withdrawal of cash for the one or more scheduled transactions or purchase of products/services at a merchant terminal in exchange for cash debited from respective user accounts associated with the one or more scheduled transactions.

The methods and systems facilitating combined transaction for one or more scheduled transactions from first and second transaction terminals without the usage of payment card are described hereinafter with reference to FIGS. 1 to 14.

FIG. 1 illustrates an example representation of an environment 100, in which at least some example embodiments of the present disclosure can be implemented.

The environment 100 depicts a rural area 102 with limited access to financial institutions in a surrounding region. Examples of the rural area 102 include villages, action area where defense personnel are posted, places located on the extreme borders and the like, wherein the facilities like ATM is not available. A first transaction terminal 104 stationed in the rural area 102 is an automated machine configured to allow rural users, for example, users 106, 108 to access user accounts locally and perform at least a part of transactions at the first transaction terminal 104. In one example, the users 106, 108 may be any person or entity holding a user account in the issuer bank. The first transaction terminal 104 facilitates cardless access of user account for performing transactions. When the users 106, 108 open a user account with the issuer bank, the issuer bank may collect at least one biometric data of the users 106, 108. For example, biometric data such as but not limited to facial features, one or more speech features, iris pattern, finger print are collected from the users 106, 108. The collected biometric data is linked with user specific details in the user account such as user name, age, address, contact details, and the like. The user account is created and is assigned with a unique account number. The created user account may be used by the user 106 for any financial transactions. The user account and the associated user details such as biometric data, user specific details, and the like are stored in a database associated with the issuer bank. Additionally or optionally, the issuer bank may provide a password, for example, a graphical code for authenticating transactions performed by the users 106,108.

In one example, the first transaction terminal 104 is configured with one or more sensors (not shown in FIG. 1) that are designed to collect at least one biometric data of the user 106. For example, an image capturing device embodied or connected with the first transaction terminal 104 captures facial features for identifying the user 106. The capturing of the facial features of the user 106 is initiated by a proximity sensor that detects the user 106 in a close proximity of the first transaction terminal 104. The first transaction terminal 104 identifies the user 106 based on the facial features and retrieves user account details of the user 106. The first transaction terminal 104 may further prompt the users 106/108 to provide additional biometric data to verify the users 106/108 and/or user account details that have been retrieved based on the biometric data. Moreover, the first transaction terminal 104 may be configured to communicate with the users 106/108 in a regional language for processing the transaction. In some example embodiments, the users 106/108 may be prompted to authenticate the transaction using a password such as, the graphical code. The graphical code is a sequence of images similar to a numeric Personal Identification Number (PIN). The first transaction terminal 104 is configured to generate a QR code corresponding to the user account details of the users 106/108 and a transaction amount requested by the users 106/108 after authentication. However, the first transaction terminal 104 is not configured to dispense money based on the transaction amount. In at least one example embodiment the first transaction terminal 104 communicates with a second transaction terminal 112 to place a hold on the transaction amount requested by the users 106/108 upon generating the QR code for the users 106/108.

The environment 100 also depicts a kiosk 111 equipped with the second transaction terminal 112 at an urban or sub-urban region. An example of the second transaction terminal 112 is the ATM. In some example embodiments, the user 106 may travel to the second transaction terminal 112 to perform a cardless transaction without a QR code. The identification and/or verification techniques employed by the second transaction terminal 112 are identical to techniques employed by the first transaction terminal 104. Additionally, the second transaction terminal 112 is capable of dispensing cash equivalent to the transaction amount requested by the user 106. However, the user 106 performing such a transaction at the second transaction terminal 112 is fraught with a risk that the second transaction terminal 112 may be running out of cash that may be requested by the user 106. However, to overcome such situations and ensure up front that the second transaction terminal 112 has sufficient cash, the user 106 may generate a QR code for a scheduled transaction at the first transaction terminal 104 (as explained above) and then travel to the second transaction terminal 112 to withdraw the transaction amount for the scheduled transaction. The generation of the QR code blocks the transaction amount at the second transaction terminal 112 for the predefined time frame.

In an embodiment, the user 106 may have to travel to the kiosk at the urban region to collect money equivalent to the transaction amount. However, the user 106 may not be able to travel to the kiosk 111 at the urban region. In such cases, the user 106 may authorize the user 108 (also referred to as "an assignee 108") to perform a scheduled transaction on behalf of the user 106 at the second transaction terminal 112. The user 106 places a first transaction request at the first transaction terminal 104 for a composite QR code. The authorization of the assignee 108 for the scheduled transaction is done at the first transaction terminal 104. It shall be noted that the assignee 108 has to hold a user account at any financial institution for performing functions as an authorized person to perform the scheduled transaction. The assignee 108 is authenticated and the QR code of the user 106 for the scheduled transaction is scanned at the first transaction terminal 104 and the user 106 authorizes the user 108 as the assignee for the scheduled transaction. The first transaction terminal 104 generates the composite QR code including user account details of the user 106, validity of the QR code, transaction amount for the scheduled transaction, and at least one authentication attribute of the assignee 108. The authentication attribute may be any of a biometric data of the assignee 108 or a password such as, a graphical code or One Time Password (OTP). More specifically, an issuer server 114 associated with a financial institution normally called as the "issuer bank" or "issuing bank" or simply "issuer", in which the user 106 may have the user account generates the QR code and/or the composite QR code for the first transaction terminal 104.

In some example embodiments, two or more users may authorize the assignee 108 to perform a combined transaction at the second transaction terminal 112. In such cases, QR codes generated individually for scheduled transactions of the two or more users are combined with the authentication attribute of the assignee 108 at the first transaction terminal 104 to generate the composite QR code. The composite QR code is generated in response to the first transaction request for a composite QR code for facilitating a combined transaction. In some example embodiments, a scheduled transaction individually assigned to the assignee 108 may also be combined by the assignee 108 with many such scheduled transactions that have been individually assigned to the assignee 108 for generating the composite QR code.

The assignee 108 may travel to the kiosk 111 at the urban region for processing the combined transaction. The second transaction terminal 112 may be remotely connected to the first transaction terminal 104 for facilitating the combined transaction. It shall be noted that the first transaction terminal 104 may be connected to one or more second transaction terminals for facilitating the combined transaction that was initiated at the first transaction terminal 104. Moreover, the second transaction terminal 112 provisions options for cardless transactions. The assignee 108 may be identified based on at least one biometric data and the user account details of the assignee 108 are fetched for processing the transaction. The assignee 108 may place a second transaction request to perform a combined transaction. For example, the assignee 108 may select an option from one or more options provisioned at the second transaction terminal 112 for performing the combined transaction. The composite QR code is scanned at the second transaction terminal 112 and the user account details of the users for one or more scheduled transactions, transactions amount for the one or more scheduled transactions, validity of the one or more scheduled transactions and authentication attribute of the assignee 108 are retrieved from the composite QR code. The second transaction terminal 112 verifies the authentication attribute of the assignee 108 and sends a request for performing the combined transaction to the issuer server 114.

The processing of the first transaction request and second transaction request may be facilitated by one or more server systems and a payment network 118. Examples of the one or more server systems include the issuer server 114, an acquirer server 116, and a payment server 120. An example of the combined transaction is a group cash withdrawal. Another example of the combined transaction may include a money transfer in an acquirer account associated with the acquirer server 116.

The acquirer server 116 is associated with the financial institution normally called as a "merchant bank" or the "acquiring bank" or "acquirer bank" or simply "acquirer". In one example, the first and/or second transaction terminals may be associated with the acquirer bank. For example, the first transaction terminal 104 receives first transaction request from the user 106 which is processed by the acquirer server 116. The first transaction request is further forwarded to the issuer server 114, which is associated with the issuer bank in which the user 106 holds the user account. Similarly, in another example, the user account of the assignee 108 may be associated with the acquirer bank. For example, the second transaction terminal 112 receives the second transaction request along with the at least one biometric data of the assignee 108. As the assignee 108 holds the user account with the acquirer server 116, the acquirer server 116 process the biometric data of the assignee 108 and sends an acknowledgement indicating successful verification to the issuer server 114.

Using the payment network 118, one or more systems of the acquirer server 116 will communicate with one or more systems of the issuer server 114 to determine whether the user account of the user 106 (or other user accounts of users who are a part of the combined transaction) is in good standing and have a balance amount equivalent or greater than the transaction amount. Upon validating the user account, authorization of the first and/or second transaction requests are declined or accepted. When the authorization is accepted, the available balance of the user account is decreased.

The request is sent to the issuer server 114 through a network 110. Examples of the network 110 may include any type of wired network, wireless network, or a combination of wired and wireless networks. A wireless network may be a wireless local area network ("WLAN"), a wireless wide area network ("WWAN"), or any other type of wireless network now known or later developed. Additionally, the network 110 may be or include the Internet, intranets, extranets, microwave networks, satellite communications, cellular systems, personal communication services ("PCS"), infrared communications, global area networks, or other suitable networks, etc. or any combination of two or more such networks.

Figure 2:
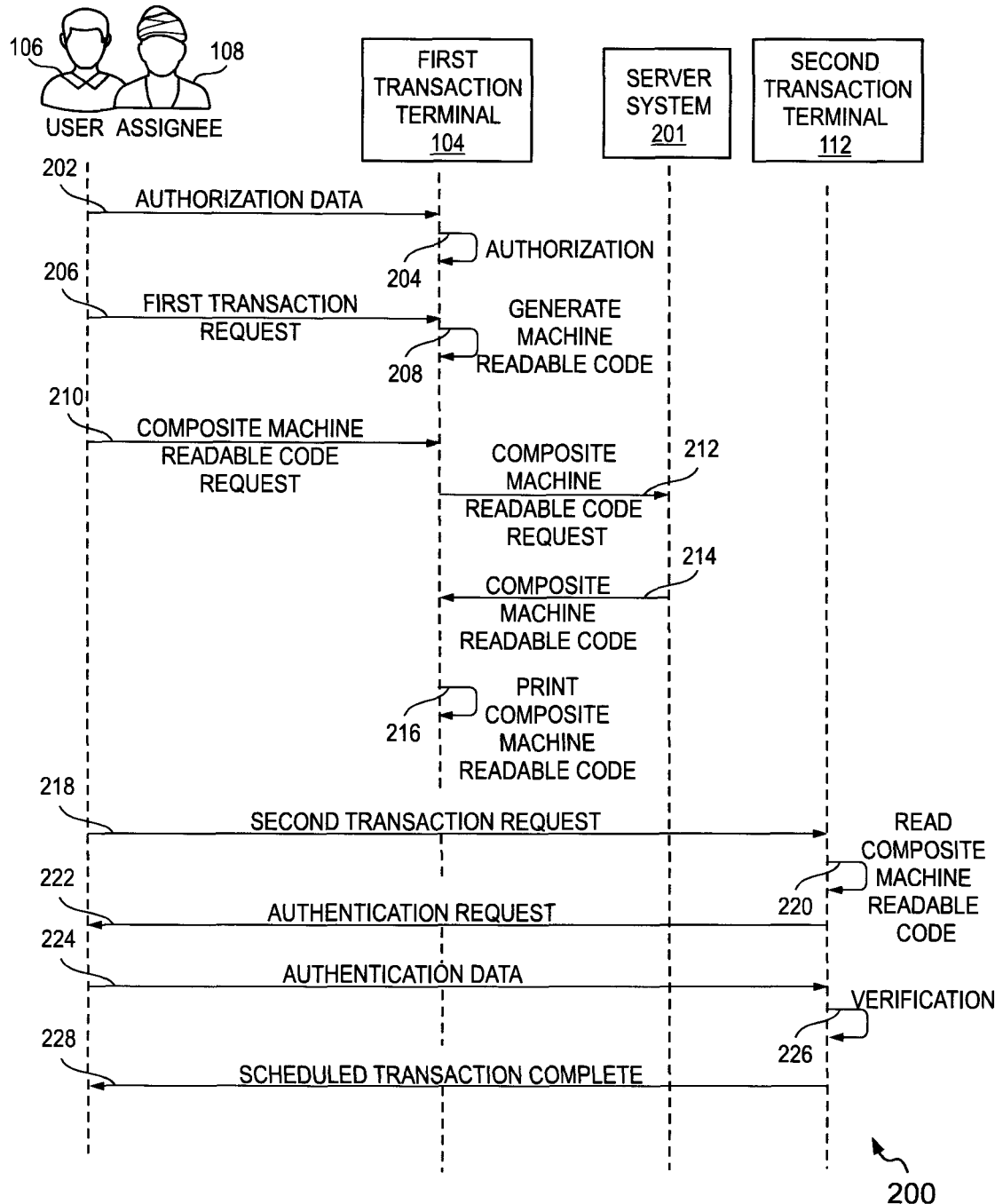
FIG. 2 represents a sequence flow diagram of processing a combined transaction for one or more scheduled transactions, in accordance with an example embodiment of the present disclosure.

Referring now to FIG. 2, a sequence flow diagram 200 of processing a combined transaction for one or more scheduled transactions is illustrated in accordance with an example embodiment of the present disclosure.

At 202, the users 106, 108 provide authorization data at the first transaction terminal 104 for a first scheduled transaction (S1). In an example, a biometric data such as, facial features of the user 106 may be captured by the first transaction terminal 104. Similarly, authorization data of the user 108 may be received to authorize the user 108 for performing a second scheduled transaction (S2). The terms 'first scheduled transaction' associated with the user 106 and the 'second scheduled transaction' associated with the user 108 are hereinafter referred to as 'scheduled transactions (S1, S2)'. In some example embodiments, the users 106, 108 may be prompted to enter credentials, such as, a graphical code for authentication of the users 106, 108. In some examples, a Personal Identification Number (PIN) may also be used for authorizing the users 106, 108 in place of or in addition to the graphical code. An example of the graphical code may be a sequence of graphical key inputs on a UI at the first transaction terminal 104 such as, an image of a dog, an ox, a plough, and a tractor. The first transaction terminal 104 may receive the authorization data from the users 106, 108 for respective scheduled transactions (S1, S2) sequentially.

At 204, the first transaction terminal 104 authorizes the users 106, 108 for respective scheduled transactions sequentially. The facial features of the user 106 may be used to retrieve user account details of the user 106. For example, the facial features of the user 106 may be compared against a plurality of pre-stored facial features to determine a pre-stored facial feature that matches with the facial features of the user 106. The plurality of pre-stored facial features is captured from a plurality of users and stored against their respective user account details. The user account details of the user 106 are retrieved based on the pre-stored facial feature that matches the facial features of the user 106. Additionally or optionally, the first transaction terminal 104 may receive biometric data such as, voice samples or fingerprint for further verifying identity of the user 106 associated with the user account details.

At 206, the user 106 initiates a first transaction request (T1) at the first transaction terminal 104. The first transaction request includes a transaction amount (A1) that the user 106 intends to debit from the user account of the user 106. Similarly, the user 108 initiates a first transaction request (T2) for debiting a transaction amount (A2) at the first transaction terminal 104. In some example embodiment, the first transaction terminal 104 sends a request to a server system 201 for verifying the user account of the users 106, 108 based on the first transaction requests (T1, T2). For example, the server system 201 checks if the users accounts of the users 106, 108 have a balance amount to provision for the transaction amounts (A1, A2).

At 208, the first transaction terminal 104 generates a machine readable code (Q1) in response to the first transaction request (T1) of the user 106. An example of the machine readable code is a Quick Response (QR) code. The machine readable code (Q1) includes user account details of the user 106, credentials of the user 106, the transaction amount (A1) and a validity of the machine readable code (Q1). For example, the machine readable code for the scheduled transaction (S1) may be valid for 24 hours. In some example embodiments, the machine readable code (Q1) may also include merchant details of a merchant at where the scheduled transaction (S1) has to be performed. For instance, the first transaction terminal 104 may include options to select a merchant from a pre-stored list of merchants. The merchant details may include a merchant name and/or a merchant identifier. Similarly, the first transaction terminal 104 generates a machine readable code (Q2) in response to the first transaction request (T2) of the user 108. It should be noted that the steps 206 and 208 may be performed for the user 106 followed by performing the steps 206 and 208 for the user 108. Additionally or optionally, the first transaction terminal 104 communicates with the second transaction terminal 112 to hold transaction amounts (A1, A2) corresponding the first transaction requests (T1, T2) at the second transaction terminal 112 for a predefined time frame, say 24 hours. Such communication of the first transaction terminal 104 with the second transaction terminal 112 for blocking/holding funds ensures that the second transaction terminal 112 has adequate cash/money equivalent to the transaction amounts (A1, A2) when the assignee 108 visits the second transaction terminal 112 for performing a combined transaction (or the scheduled transactions S1, S2). However, it should be apparent to a person skilled in the art that placing a hold on the transaction amounts at the second transaction terminal 112, such as, an ATM interface may not be necessary when the transaction is for a merchant at the merchant terminal.

At 210, the user 106/user 108 places a request for generating a composite machine readable code for the scheduled transactions (S1, S2). For instance, the user 106 may not be able to visit the second transaction terminal 112 for performing a transaction/withdrawing money. In such cases, the user 106 may request the user 108 to perform the transaction on behalf of the user 106. In such a scenario, the machine readable code of the user 106 may be combined with an authentication attribute of the user 108 for generating the composite machine readable code. In some example embodiments, the composite machine readable code is generated by combining the machine readable codes (Q1, Q2) of the users 106, 108, respectively along with an authentication attribute of the user 108 (also referred to as 'the assignee 108'). The authentication attribute of the assignee 108 may include but not limited to, user account details of the assignee 108 or at least one biometric data of the assignee 108. In at least one example embodiment, the users 106, 108 may also provide details of a merchant associated with a merchant terminal at where the scheduled transactions (S1, S2) are to be performed by the assignee 108. More specifically, the composite machine readable code is configured such that it includes information for facilitating a combined transaction for the scheduled transactions (S1, S2) at the second transaction terminal 112 for the transaction amounts (A1, A2) of the users 106, 108, respectively.

At 212, the request for generating the composite machine readable code is sent to a server system 201. The server system 201 may be any of the acquirer server 116, the issuer server 114, or the payment server 120.

At 214, the server system 201 generates the composite machine readable code as explained with respect to step 210 and sends it to the first transaction terminal 104. In an embodiment, when the composite machine readable code is generated, the machine readable codes (Q1, Q2) are blocked and the machine readable codes (Q1, Q2), individually, may not be valid to perform transactions for the transaction amounts (A1, A2) at the second transaction terminal 112.

At 216, the first transaction terminal 104 prints the composite machine readable code for the assignee 108.

At 218, the assignee 108 places a second transaction request at the second transaction terminal 112. The second transaction request includes the composite machine readable code. In one embodiment, the second transaction terminal 112 is an ATM interface which the assignee 108 visits to perform group withdrawal for the scheduled transactions (S1, S2) of the users 104, 106. For instance, the assignee 108 collects cash/money worth the transaction amounts (A1+A2) dispensed at the ATM interface for the users 104, 106. In another embodiment, the second transaction terminal 112 is the merchant terminal of the merchant where the users 106, 108 and/or assignee 108 have purchased goods/services. For example, if the rural users 104, 106, and 108 intend to buy books for a community library, they may purchase the books via an online merchant store with help of a person, say, the assignee 108. In such cases, the rural users 104, 106, and 108 may agree on sharing costs (C1) incurred for purchasing the books. The users 104, 106, and 108 may individually initiate scheduled transactions (S1, S2, S3) for the transaction amounts (A1, A2, A3) at the first transaction terminal 104 and then subsequently combine the machine readable codes of scheduled transactions (S1, S2, and S3) for performing a combined transaction at merchant terminal of the merchant by generating the composite machine readable code.

At 220, the second transaction terminal 112 reads the composite machine readable code. For instance, the second transaction terminal 112 identifies and retrieves details of the assignee 108 and at least one authentication attribute of the assignee 108.

At 222, the second transaction terminal 112 sends an authentication request to the assignee 108. The second transaction terminal 112 provides cardless access to user account for performing transactions. Accordingly, at least one biometric data of the assignee 108 may be received by the second transaction terminal 112 for authorizing the assignee 108.

At 224, the assignee 108 provides the authentication data. Examples of the authentication data may include but not limited to facial features, iris pattern, fingerprint, graphical code, and the like for authenticating the assignee 108.

At 226, the second transaction terminal 112 verifies the authentication data of the assignee 108. For example, the authentication data may be compared against the at least one authentication attribute of the assignee 108.

At 228, the scheduled transactions (S1, S2) are completed. The second transaction terminal 112 reads the machine readable codes (Q1, Q2) from the composite machine readable code and further checks the validity of the machine readable codes (Q1, Q2). If the machine readable codes are valid (Q1, Q2), the second transaction terminal 112 sends a request to the server system 201 for validating the user account associated with machine readable codes (Q1, Q2). The transaction amounts (A1, A2) are debited by the server system 201 from respective user accounts of the users 106, 108. If the assignee 108 performed the combined transaction at the ATM interface, the transaction amounts (A1, A2) temporarily held at the second transaction terminal 112 based on the communication received from the first transaction terminal 104 is dispensed to the assignee 108. For example, the second transaction terminal 112 receives instructions from the server system 201 for dispensing money equivalent to the transaction amounts (A1, A2) for the assignee 108 based on the verification. If the combined transaction is performed at the merchant terminal, the transaction amounts (A1, A2) are debited from user accounts of the users 104, 106, 108 and credited to a merchant account associated with the merchant.

Figure 3:
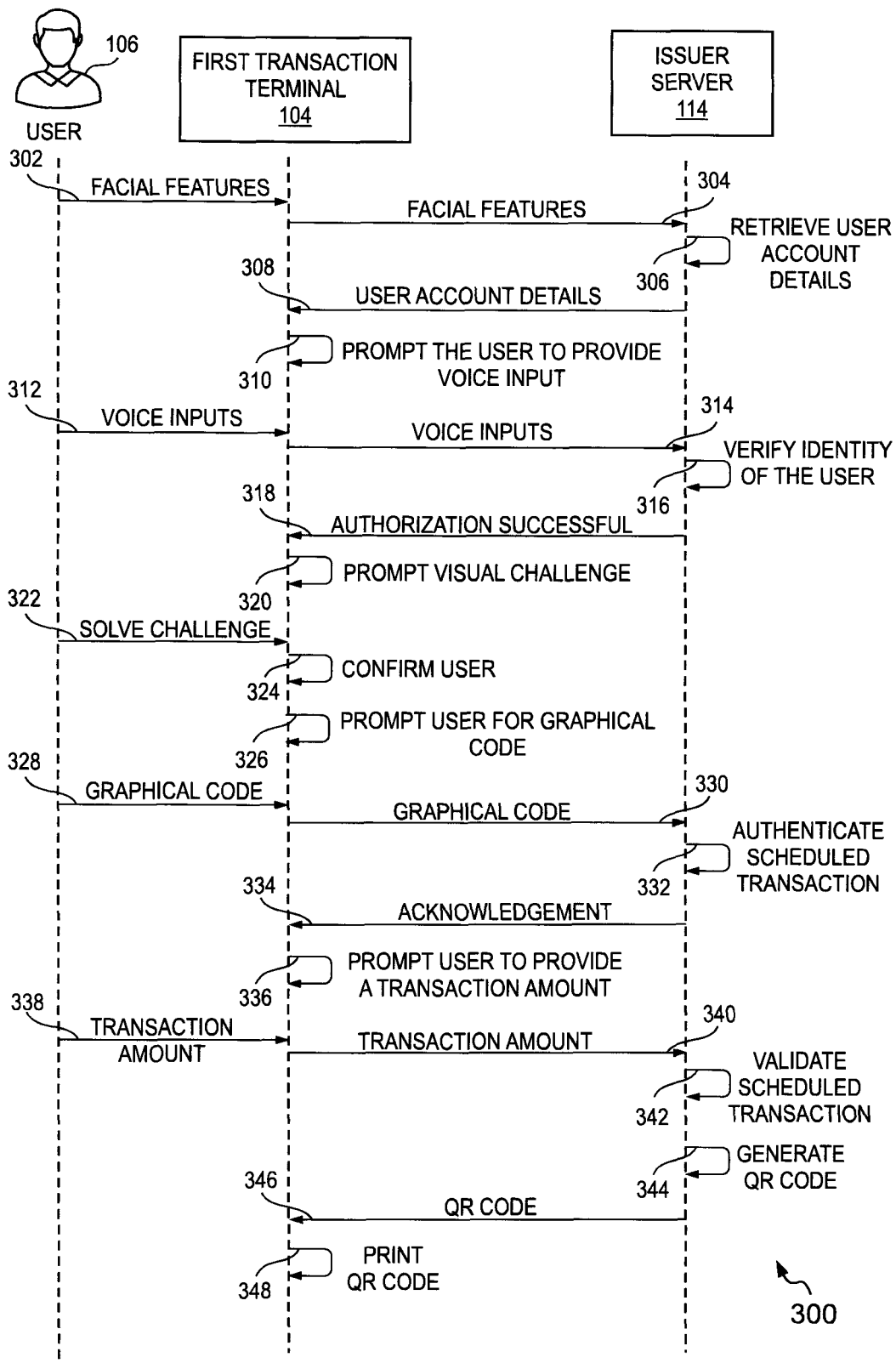
FIG. 3 represents a sequence flow diagram of generating a machine readable code such as a Quick Response (QR) code at a first transaction terminal for a scheduled transaction, in accordance with an example embodiment of the present disclosure.

FIG. 3 represents a sequence flow diagram 300 of generating a Quick Response (QR) code at the first transaction terminal 104 for a scheduled transaction, in accordance with an example embodiment of the present disclosure. The user 106 may perform a part of the scheduled transaction at the first transaction terminal 104 installed locally for generating the QR code. If the user 106 is unable to visit the second transaction terminal 112 for performing the scheduled transaction, the user 106 may generate the QR code at the first transaction terminal 104 and further assign it to an authorized person who may perform the scheduled transaction on his/her behalf.

At 302, the first transaction terminal 104 receives facial features from the user 106. For instance, when the user 106 approaches the first transaction terminal 104, the first transaction terminal 104 detects the presence of the user 106. In one example, the presence of the user 106 may be detected by the first transaction terminal 104 with the help of at least one proximity sensor. When the user 106 is in the vicinity of the first transaction terminal 104, the proximity sensors activate at least one biometric sensor disposed on the first transaction terminal 104. Further, in another example, the first transaction terminal 104 is disposed with an image capturing device such as, a camera. The camera is configured to capture facial features of the user 106.

At 304, the facial features of the user 106 captured by the camera are sent to the issuer server 114.

At 306, the issuer server 114 processes the facial features received by the user 106 to retrieve the associated user account details. More specifically, the issuer server 114 compares the received facial features with a plurality of pre-stored biometric data of a plurality of users stored in a database associated with the issuer server 114. Each pre-stored biometric data of the plurality of pre-stored biometric data of a user, for example, the user 106 is linked with user account details of the user 106. The step 306 may be performed to identify the user 106 and upon identifying the user 106, the user account details of the user 106 are retrieved from the database.

At 308, the user account details of the user 106 are sent to the first transaction terminal 104. At 310, the first transaction terminal 104 prompts the user 106 to provide his/her voice input. For instance, the first transaction terminal 104 may play a welcome message, from one or more speakers installed on the first transaction terminal 104, to the user 106 and requests the user 106 to provide his/her name, for example, the message may sound like, 'WELCOME TO THE BANK X, KINDLY PROVIDE YOUR NAME'. In one example, depending on the location of the first transaction terminal 104 where it is stationed, the first transaction terminal 104 plays the welcome message in the regional language of the location to make the interaction more personal to the user 106.

At 312, in response to the message played by the first transaction terminal 104, the user 106 provides his/her voice input by speaking out his/her name. At 314, the user name is recorded by the first transaction terminal 104, which is further sent to the issuer server 114. At 316, the issuer server 114 processes the voice input. In one example, the issuer server 114 may, firstly, convert the speech to text and identify the user name. Alternatively, the voice input may be used as the one of the biometric inputs, and one or more speech features are extracted to establish identity of the user 106. In an example, the name and the voice identification along with facial features are mapped to a pre-stored biometric data of the user 106, which is collected from the user 106 during a registration of the user 106 with the issuing bank. The mapping of biometric data retrieved from the user 106 to the pre-stored biometric data of the user 106 enable verification of identity of the user 106 prior to further processing of the scheduled transaction. Examples of the biometric data include but not limited to facial features, fingerprint, speech features, iris pattern, and the like.

At 318, the identity of the user 106 is established when the issuer server 114 sends an authorization successful message to the first transaction terminal 104. At 320, the first transaction terminal 104 prompts the user 106 to solve one or more visual challenges. In one example, visual challenges may be simple puzzles to make sure the user 106 is not a robot. For example, the puzzles may be identification of colors, identification of animals, simple math problems, and the like.

At 322, the user 106 provides a response to the challenges/puzzles. At 324, the first transaction terminal 104 is configured to process the response submitted by the user 106 in response to the prompted visual challenge for confirming that the user 106 is a human and not a spam/robot.

Optionally, at 326, the first transaction terminal 104 prompts the user 106 to provide a graphical code (password) to validate the scheduled transaction. In one example, the graphical code may be series of images such as a picture of a horse followed by a human image followed by an image of rabbit and an image of dog. It shall be noted that the first transaction terminal 104 provisions a graphical keypad (see, FIG. 7) in place of a numerical keypad to provide the graphical code. At 328, the user 106 provides the graphical code at the first transaction terminal 104. At 330, the first transaction terminal 104 sends the graphical code to the issuer server 114.

At 332, the issuer server 114 verifies the password (graphical code) and authenticates the scheduled transaction. For example, the issuer server 114 compares the graphical code against a pre-stored graphical code with the user account details of the user 106. At 334, an acknowledgement is sent to the first transaction terminal 104 confirming authentication of the user 106 for the scheduled transaction.

At 336, the first transaction terminal 104 prompts the user to provide a transaction amount for the scheduled transaction to be performed at the second transaction terminal 112. At 338, the user 106 provides the transaction amount at the first transaction terminal 104. In one example, the user 106 may provide the transaction amount via voice input and/or typing the transaction amount at a user interface of the first transaction terminal 104. As an example, when the first transaction terminal 104 prompts the user 106 to provide the transaction amount, say in a regional language of the user 106, the user 106 may speak out the transaction amount in the regional language in response to the prompt of the first transaction terminal 104.

At 340, the first transaction terminal 104 captures the transaction amount and sends it to the issuer server 114. The first transaction terminal 104 may locally process the voice input or user inputs on the user interface and determines the transaction amount that is sent to the issuer server 114.

At 342, the issuer server 114 validates the scheduled transaction. The issuer server 114 verifies an account balance in the user account of the user 106. In one example, the issuer server 114 verifies whether the account balance is sufficient to fund the scheduled transaction for the transaction amount requested by the user 106.

At 344, the issuer server 114 generates the QR code for the scheduled transaction. The QR code includes the user account details, transaction amount, and a validity of the QR code. In at least one example embodiment, money equivalent to the transaction amount is placed on hold at the second transaction terminal 112 for the scheduled transaction of the user 106. The first transaction terminal 104 may optionally display a message indicating to the user 106 about the money held temporarily till an expiry of the QR code for the scheduled transaction.

At 346, the issuer server 114 sends the QR code to the first transaction terminal 104. At 348, the first transaction terminal 104 equipped with a printer is configured to print the QR code for the scheduled transaction. In another example, after generating the QR code, the issuer server 114 may send the QR code to a user device of the user 106. The QR code is generated for the scheduled transaction of the user 106. Similarly, multiple users may generate multiple QR codes by means of the method described with reference to FIG. 3.

As explained above, the user 106 performs at least a part of the scheduled transaction at the first transaction terminal 104 and complete the scheduled transaction at the second transaction terminal 112. Herein, the part of scheduled transaction refers to authentication of the user and generation of the QR code containing the information related to the scheduled transaction. For example, the user 106 may generate the QR code at the first transaction terminal 104 and assign it to a person (e.g., the user/assignee 108) who can subsequently travel to the second transaction terminal 112 for performing the scheduled transaction and collect the transaction amount. The assignee 108 is required to scan the QR code and the money equivalent to the transaction amount is dispensed from the second transaction terminal 112 (also referred to as 'an ATM interface').

Figure 4:
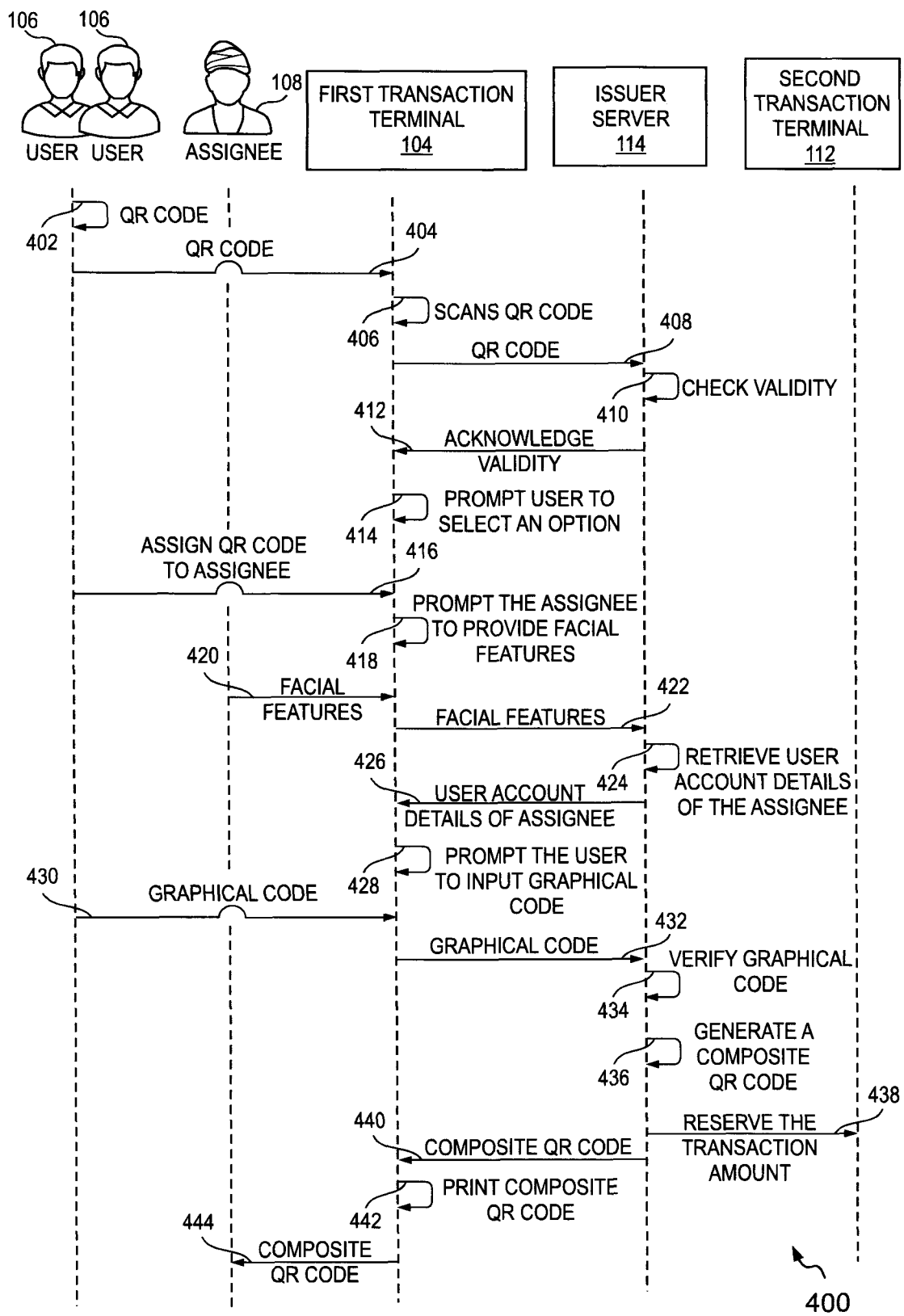
FIG. 4 represents a sequence flow diagram of authorizing an assignee to perform a transaction at the second transaction terminal on behalf of the users by assigning the QR code to the assignee, in accordance with an example embodiment of the present disclosure.

FIG. 4 represents a sequence flow diagram 400 of authorizing the assignee 108 to perform a scheduled transaction at the second transaction terminal 112 on behalf of the user 106 by assigning the QR code to the assignee 108, in accordance with an example embodiment of the present disclosure. If the user 106 is not able to perform the scheduled transaction at the second transaction terminal 112, the user 106 may wish to authorize the assignee 108 to perform the scheduled transaction at the second transaction terminal 112. Accordingly, the user 106 assigns the QR code generated at the first transaction terminal 104 to the assignee 108 by combining at least one authentication attribute of the assignee 108 with the QR code including user account details, validity of the QR code, and the transaction amount to generate a composite QR code.

Although the method 400 is described with taking example of one user 106 assigning the QR code to the assignee 108, it should be noted that multiple such users 106 can assign their QR codes to the assignee 108. For instance, all of the users 106 can generate QR codes as per the process described with reference to FIG. 3, and the first transaction terminal 104 is configured to concatenate the QR codes to generate the composite QR code, where the composite QR code has all the details needed to perform a combined scheduled transaction at the second transaction terminal 112 by the assignee 108.

The flow diagram 400 start at 402, where the user 106 obtains the QR code from the first transaction terminal 104 (through the method described with reference to FIG. 3). At 404, the user 106 approaches the first transaction terminal 104 with the QR code. At 406, the user 106 scans the QR code at the first transaction terminal 104. In one example, the first transaction terminal 104 includes a scanning module that is configured to scan the QR code. The scanning module in the first transaction terminal 104 reads the QR code to determine QR code data such as, user account details of the user 106, validity of the QR code, and the transaction amount of the scheduled transaction. At 408, the QR code data is forwarded to the issuer server 114. At 410, the issuer server 114 processes the QR code data to check validity of the QR code. At 412, on determining the validity of the QR code, an acknowledgment is sent to the first transaction terminal 104.

At 414, the first transaction terminal 104 provisions one or more UIs and prompts the user 106 to select an option among a plurality of options displayed on the UI of the first transaction terminal 104. For example, the first transaction terminal 104 may provision options such as but limited to, 'BLOCK QR CODE', 'ASSIGN QR CODE', 'COMBINE QR CODES', 'CHANGE TRANSACTION AMOUNT', 'CHECK TRANSACTION AMOUNT' and the like. As an example, the user 106 may provide a selection input on the option associated with text 'CHECK TRANSACTION AMOUNT', the user 106 may check the transaction amount and reassure himself/herself. By selecting the option associated with text 'CHANGE THE TRANSACTION AMOUNT', the user 106 may change the transaction amount for the scheduled transactions.

At 416, the user 106 selects the option associated with text 'ASSIGN QR CODE' to assign the QR code to the assignee 108, who may perform the scheduled transaction at the second transaction terminal 112 on behalf of the user 106. The user 106 may either provide a selection input or provide a voice input that may automatically provision another UI for providing details of the assignee 108.

At 418, on receiving the selection input on the option 'ASSIGN QR CODE TO ASSIGNEE' or the voice input corresponding to the option from the user 106, the first transaction terminal 104 pops a message on the UI, requesting at least one authentication attribute of the assignee 108. Examples of the at least one authentication attribute include but not limited to finger print, facial features, iris pattern, voice input or any biometric data.

At 420, the assignee 108 provides facial features to the first transaction terminal 104. In one example, the camera disposed in the first transaction terminal 104 captures facial features of the assignee 108. It shall be noted that facial features have been used as an example to describe the at least one authentication attribute and the assignee 108 may provide any alternate biometric data as an authentication attribute.

At 422, the facial features of the assignee 108 are sent to the issuer sever 114 and at 424, the facial features of the assignee 108 are processed to retrieve user account details of the assignee 108. It shall be noted that description of the present disclosure is limited to the assignee 108 being a part of the financial system and holding at least one user account. In one example, the facial features (authentication attribute) of the assignee 108 are compared against a plurality of pre-stored biometric data associated with a plurality of users, wherein each user is associated with a user account, to determine the pre-stored biometric data that matches the facial features of the assignee 108. Accordingly, when a match is found, user account details corresponding to the pre-stored biometric data are fetched to establish identity of the assignee 108.

At 426, a message establishing identity of the assignee 108 and assignee account details are sent to the first transaction terminal 104. At 428, the first transaction terminal 104 prompts the user 106 to provide the graphical code. In one example, the graphical code is configured to authenticate the process of generation of the composite QR code. Optionally, the assignee 108 may also be prompted to provide a graphical code corresponding to user account details so as to verify the identity of the assignee 108. At 430, the user 106 provides the graphical code at the first transaction terminal 104 via the graphical keypad facilitated at the first transaction terminal 104.

At 432, the graphical code is sent to the issuer server 114 from the first transaction terminal 104. At 434, the graphical code of the user 106 is verified by the issuer server 114 so as to enable the option of assigning the QR code to the assignee 108. At 436, the issuer server 114 generates a composite QR code. The composite QR code includes the at least one authentication attribute of the assignee 108, user account details, validity of the QR code and the transaction amount for the scheduled transaction of the user 106. At 438, optionally the issuer server 114 reserves the transaction amount (places a temporary hold on the transaction amount from dispensing) for the validity of the composite QR code. It shall also be noted that the QR code for the scheduled transaction is blocked so as to prevent fraudulent activities.

At 440, the issuer server 114 sends the composite QR code to the first transaction terminal 104. Optionally, the composite QR code may be sent to a user device associated with the assignee 108. At 442, the first transaction terminal 104 equipped with a printer is configured to print the composite QR code and at 444, the composite QR code may be collected by the assignee 108. The composite QR code may be used by the assignee 108 to perform the scheduled transaction and withdraw money corresponding to the transaction amount from the second transaction terminal 112.

In one example, multiple users may assign their respective QR codes to the assignee 108. The assignee 108 may now combine the multiple QR codes received from multiple users into one single QR code i.e. the composite QR code. In one example, the composite QR code may be configured with multiple QR code data from multiple users along with identity of the assignee 108. The process of combining two or more QR codes into the composite QR code eliminates the process of performing multiple transactions for withdrawal of cash for two or more users by the assignee 108. The process of performing a combined transaction by combining two or more QR codes into the composite QR code is described with reference to FIG. 5.

Figure 5:
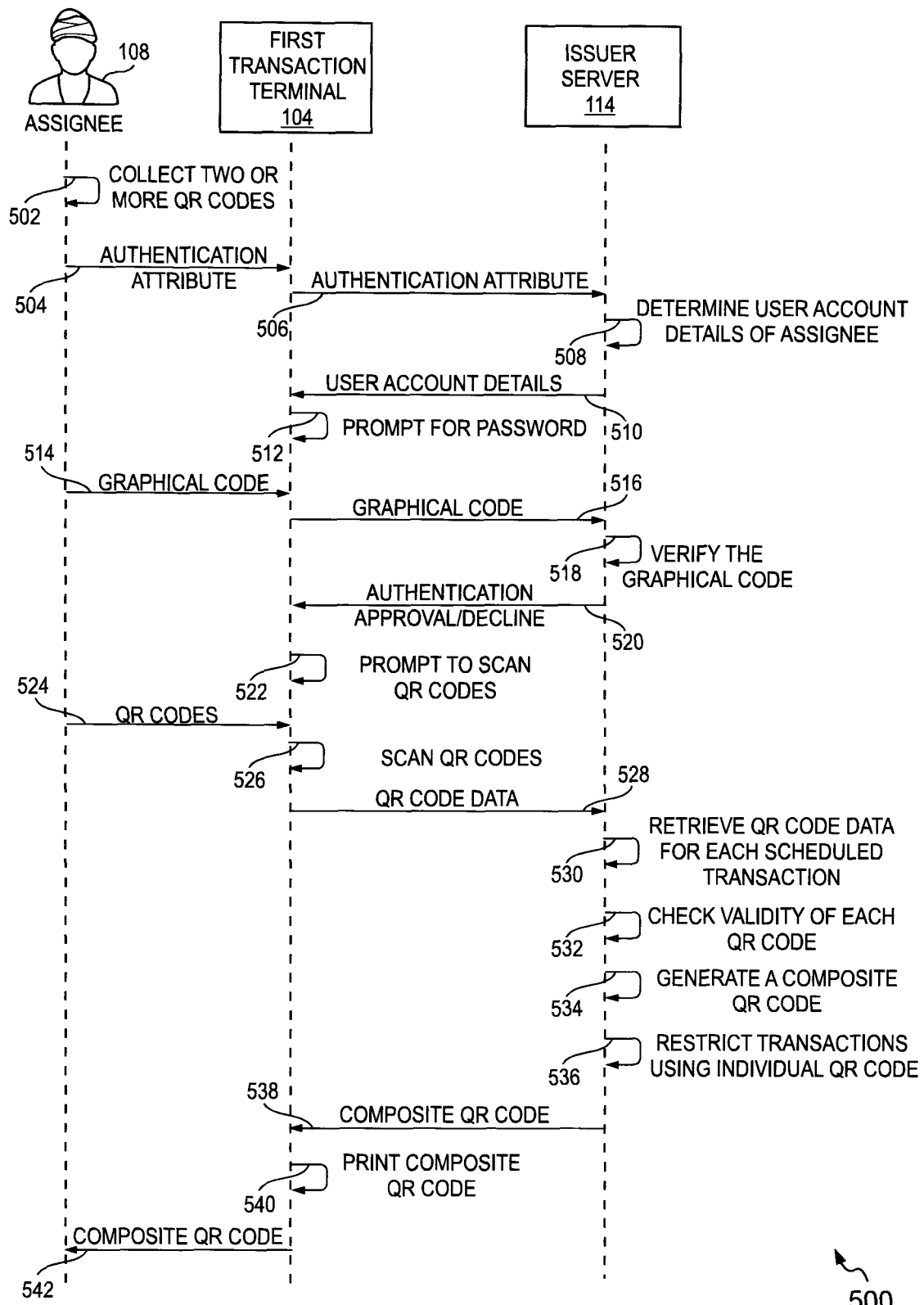
FIG. 5 represents a sequence flow diagram of generating a composite QR code at a first transaction terminal for processing a combined transaction of one or more scheduled transactions at a second transaction terminal, in accordance with an example embodiment of the present disclosure.

FIG. 5 represents a sequence flow diagram 500 of generating a composite QR code at the first transaction terminal 104 for processing a combined transaction of one or more scheduled transactions at the second transaction terminal 112, in accordance with an example embodiment of the present disclosure. At 502, the assignee 108 collects QR codes from two or more users for two or more scheduled transactions. In one embodiment, each of the QR codes may be intermediate composite codes including user account details, a transaction amount, and authentication attribute of the assignee 108 when a user (e.g., the user 106) assigns the scheduled transaction to the assignee 108. The assigning of each QR code to the assignee 108 is as described with reference to FIG. 4. In some example embodiments, the QR codes of users may not be individually assigned to the assignee 108, and such QR codes include user account details and transaction amount only. In such an example scenario, each user of the two or more users optionally authenticate themselves and then authorize the assignee 108 to combine the QR codes for generating the composite QR code that facilitates the combined transaction.

At 504, the assignee 108 provides at least one authentication attribute, such as facial features at the first transaction terminal 104. At 506, the first transaction terminal 104 sends the authentication attribute to the issuer server 114. At 508, the issuer server 114 processes the received facial features so as to identify the assignee 108 and user account details related to the assignee 108.

At 510, a message establishing identity of the assignee 108 and user account details of the assignee 108, is sent to the first transaction terminal 104. At 512, the first transaction terminal 104 prompts the assignee 108 to provide a password to authorize the assignee 108 to combine two or more QR codes for generating a composite QR code for a combined transaction. In one example, the password may be a graphical code that is linked to the user account details of the assignee 108 so as to verify the identity of the assignee 108.

At 514, the assignee 108 provides the graphical code at the first transaction terminal 104 via a graphical keypad. At 516, the graphical code is sent to the issuer server 114. At 518, the issuer server 114 verifies the identity of the assignee 108 based on the graphical code. In one example the graphical code may be a security password configured to identify the assignee 108. In other words, the assignee 108, assigned to carry out cash withdrawal on behalf of the user 106, is assigned with a graphical code specific to accessing user account of the assignee 108. The graphical code is configured to authorize the interaction of the assignee 108 with the first transaction terminal 104, the issuer server 114, and the second transaction terminal 112. At 520, the issuer server 114 sends a message indicating authentication approval or decline to the first transaction terminal 104 based on verification of the graphical code. At 522, the first transaction terminal 104 prompts the assignee 108 to scan two or more QR codes. For example, the first transaction terminal 104 may provide one or more transaction options for the assignee 108 for processing transactions. In an example embodiment, the assignee 108 may provide a selection input on a transaction option corresponding to combining two or more QR codes (see, FIG. 8A). In one example, when the assignee 108 selects the transaction option for combining two or more QR codes, the first transaction terminal 104 may play a message requesting the assignee 108 to scan the two or more QR codes. For example, the message may sound similar to, 'KINDLY SCAN MULTIPLE QR CODES ASSIGNED TO YOU', or in another example, the first transaction terminal 104 may display a message requesting the assignee 108 to scan the two or more QR codes.

At 524, the assignee 108 may provide the two or more QR codes to the first transaction terminal 104. At 526, the first transaction terminal 104 may scan two or more QR codes, by scanning one QR code at a time. In one example, the first transaction terminal 104, configured with a camera, scans two or more QR codes assigned to the assignee 108 by two or more users, for example, QR code printed on paper or QR codes displayed via user devices.

At 528, the first transaction terminal 104 sends the QR code data captured from the two or more QR codes to the issuer server 114. At 530, the issuer server 114 retrieves QR code data associated with each QR code for a scheduled transaction. The QR code data for each QR code of the two or more QR codes may include information such as but not limited to a validity of the QR code, a user account details, a transaction amount, and optionally an assignee details. At 532, the issuer server 114 checks the validity of each QR code of two or more QR codes. The validity of the QR code may include, but not limited to, expiry date and/or expiry time of the QR code to determine if the QR code corresponding to the scheduled transaction is valid.

At 534, the issuer server 114 generates a composite QR code by combining the two or more QR codes. For example, the composite QR code may include user account details of the plurality of users for the two or more scheduled transactions, transaction amount for each scheduled transaction of the two or more scheduled transactions and at least one authentication attribute of the assignee 108.

In one example, at 536, the issuer server 114 may restrict transactions using individual QR codes when the composite QR code is generated. This prevents fraudulent activities using the discarded QR code. At 538, the issuer server 114 provides the composite QR code to the first transaction terminal 104. At 540, the first transaction terminal 104 equipped with a printer prints the composite QR code, and at 542, the assignee 108 collects the composite QR code. Once the composite QR code is generated, the assignee 108 may perform the combined transaction from the second transaction terminal 112 using the composite QR code. An example of the assignee 108 performing the combined transaction at the second transaction terminal 112 for the two or more scheduled transactions is shown and explained with reference to FIG. 6.

Figure 6A:
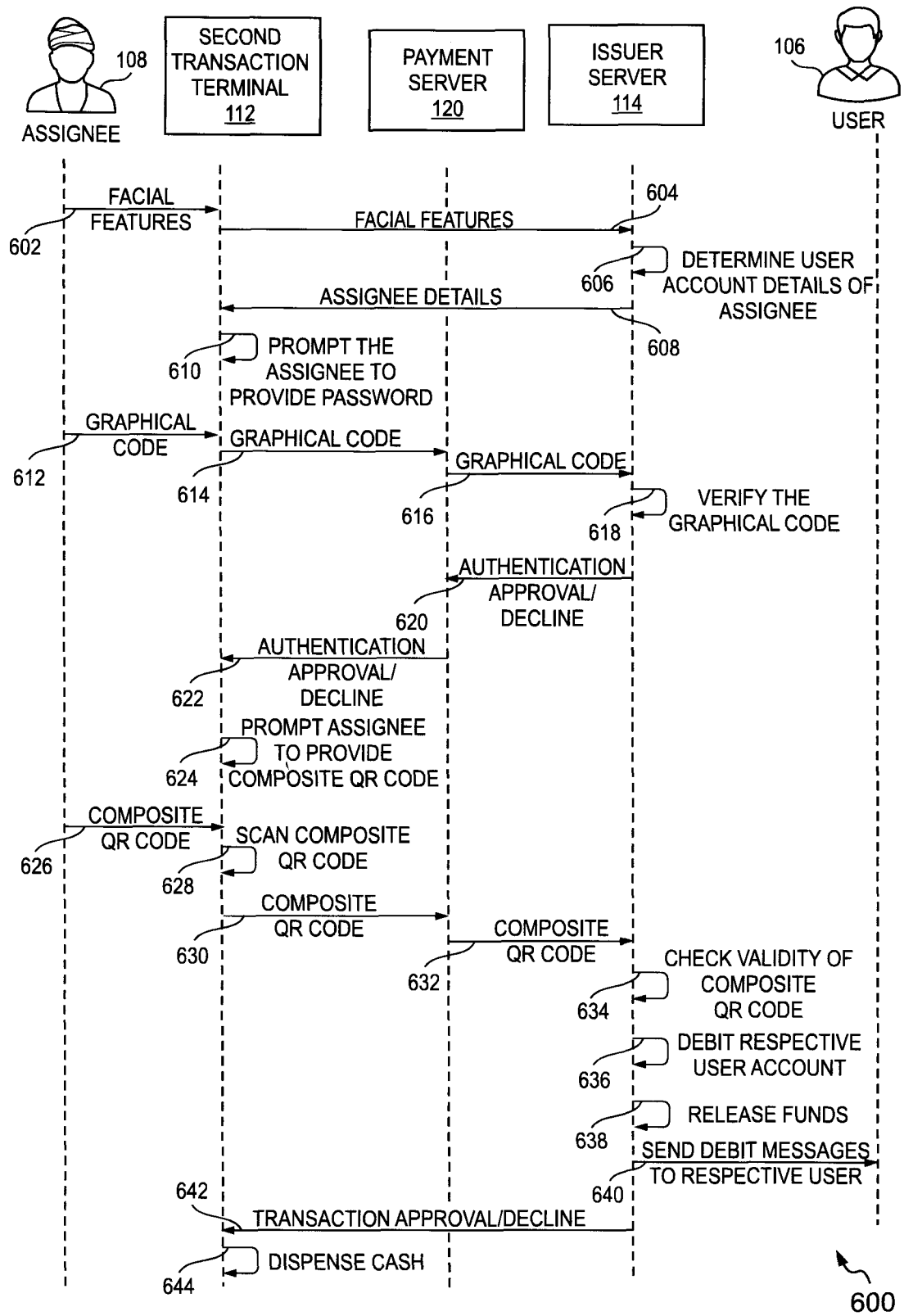
FIG. 6A represents a sequence flow diagram of an assignee performing a combined transaction for one or more scheduled transactions at a second transaction terminal, in accordance with an example embodiment of the present disclosure.

FIG. 6A represents a sequence flow diagram 600 of the assignee 108 performing a combined transaction for one or more scheduled transactions at the second transaction terminal 112, in accordance with an example embodiment of the present disclosure. The assignee 108 carries the composite QR code generated for a scheduled transaction (explained with reference to FIG. 4) or two or more scheduled transactions (explained with reference to FIG. 5) to the second transaction terminal 112 (e.g., the ATM interface) for performing the combined transaction.

At 602, the assignee 108 provides at least one biometric data, such as facial features at the second transaction terminal 112. The assignee 108 may walk to the second transaction terminal 112 and the second transaction terminal 112 may capture facial features of the assignee 108. The biometric data provided by the assignee 108 may also be at authentication attribute embedded in the composite QR code for verifying credentials of the assignee 108. At 604, the second transaction terminal 112 sends the facial features to the issuer server 114.

At 606, the issuer server 114 processes the facial features for identifying user account details and retrieving the user account details corresponding to the assignee 108. Optionally, the facial features may also be used to verify identity of the assignee 108 so as to determine if the assignee 108 is the authorized person for the combined transaction. At 608, the assignee details, for example, the user account details of the assignee 108 and optionally a message confirming the identity of the assignee 108 based on the biometric data is sent to the second transaction terminal 112.

At 610, the second transaction terminal 112 prompts the assignee 108 to provide a password for authorizing transactions performed by the assignee 108 at the second transaction terminal 112. At 612, the assignee 108 may provide the password such as, a graphical code at the second transaction terminal 112 via a graphical keypad. At 614, the graphical code is sent to the payment server 120. At 616, the payment server 120 forwards the graphical code to the issuer server 114. At 618, the issuer server 114 verifies the graphical code to authenticate transactions of the assignee 108 to be performed at the second transaction terminal 112. In one example the graphical code may be a security password configured to identify the assignee 108 and provide access to the user account of the assignee 108. In other words, the assignee 108, assigned to carry out cash withdrawal on behalf of the user 106, is assigned with a graphical code specific for the assignee 108. The assigned graphical code is configured to authorize interaction of the assignee 108 with the first transaction terminal 104, the issuer server 114, and the second transaction terminal 112.

At 620, the issuer server 114 sends an authentication approval or decline message to the payment server 120. At 622, the payment server 120 forwards the authentication approval or decline message to the second transaction terminal 112. At 624, the second transaction terminal 112 prompts the assignee 108 to provide the composite QR code. In at least one example embodiment, the second transaction terminal 112 determines that a combined transaction of one or more scheduled transactions is linked with the assignee 108 based on the user account details of the assignee 108 and prompts the assignee 108 to provide the composite QR code for the one or more scheduled transactions. Alternatively, the second transaction terminal 112 may provide one or more transaction options and the assignee 108 may select a transaction option associated with combined transactions. In one embodiment, when the second transaction terminal 112 detects that the assignee 108 intends to perform the combined transactions, the second transaction terminal 112 may play a message requesting the assignee 108 to scan the composite QR code. The message may sound like, 'KINDLY SCAN THE QR CODE', or the second transaction terminal 112 may display a message requesting the assignee 108 to scan the composite QR code.

At 626, the assignee 108 provides the composite QR code to the second transaction terminal 112. For example, the assignee 108 may flash the composite QR code (printed on a piece of paper or displayed on a display screen of user device of the assignee 108) in front of the second transaction terminal 112 equipped with a camera. Alternatively, the assignee 108 may feed a paper including the composite QR code to scanning module present in the second transaction terminal 112.

At 628, the second transaction terminal 112 scans the composite QR code to determine composite QR code data. The composite QR code data may include information such as but not limited to, user account details of the one or more users associated with the one or more scheduled transactions, transaction amount for the one or more scheduled transactions and the authentication attribute of the assignee 108. At 630, the second transaction terminal 112 sends the composite QR code data to the payment server 120. At 632, the payment server 120 forwards the composite QR code data captured from the composite QR code to the issuer server 114.

At 634, the issuer server 114 checks the validity of the composite QR code. The validity may include, but not limited to, expiry date and/or expiry time for the composite QR code. In at least one example embodiment, the issuer server 114 checks if the authentication attribute of the assignee 108 present in the composite QR code and the biometric data provided at the second transaction terminal 112 match. In an example, if the assignee 108 had provided a fingerprint as the authentication attribute and the biometric data collected at the second transaction terminal 112 for authenticating the assignee 108 was facial features, then the second transaction terminal 112 prompts the assignee 108 to provide the authentication attribute (fingerprint) so as to authorize the combined transaction.

At 636, the issuer server 114 debits user accounts of respective transaction amount based on the one or more scheduled transactions. For example, the composite QR code may include user account details D1, D2, D3 of users U1, U2, U3 for transaction amounts A1, A2, A3, respectively. The issuer server 114 debits user account of user U1 of transaction amount A1, user account of user U2 of transaction amount A2, and user account of user U3 of transaction amount A3. At 638, the issuer server 114 releases funds for the combined transaction. The issuer server 114 approves a transaction request (e.g., the second transaction request) for releasing money associated with the one or more scheduled transactions. As an example, the issuer server 114 releases money equivalent to sum of the transaction amounts A1, A2, and A3 associated with the one or more scheduled transactions.

At 640, the issuer server 114 optionally sends a debit message to the one or more users associated with the one or more scheduled transactions on debit of the transaction amount from respective user accounts based on the composite QR code. At 642 the issuer server 114 sends a transaction approval or decline message to the second transaction terminal 112. At 644, the second transaction terminal 112 dispenses money for the combined transaction and the assignee 108 collects the money. Further, the assignee 108 may distribute the money to the one or more users associated with the one or more scheduled transactions based on their respective transaction amount as indicated by the composite QR code.

Figure 6B:
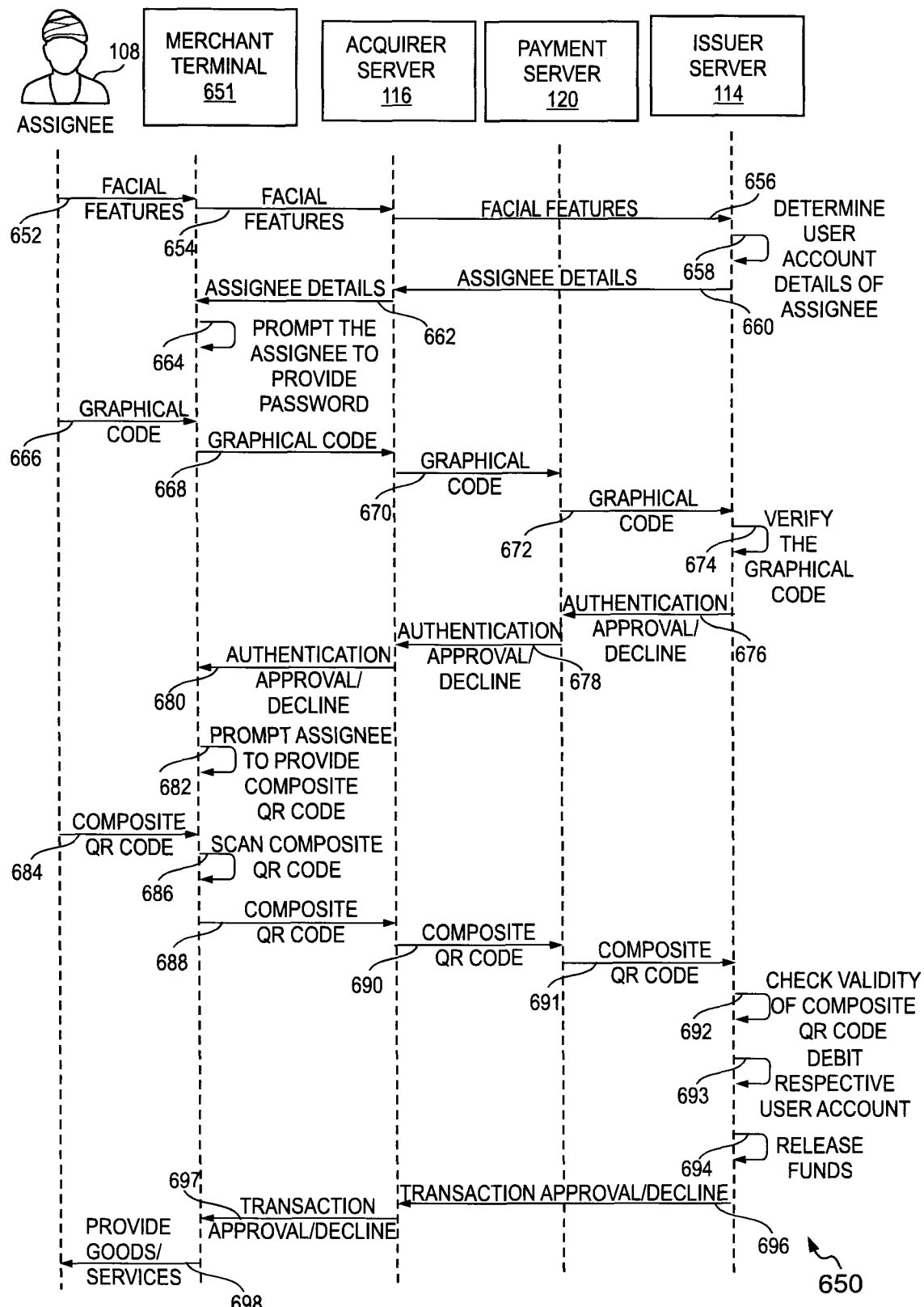
FIG. 6B represents a sequence flow diagram of an assignee performing a combined transaction for one or more scheduled transactions at a second transaction terminal, in accordance with another example embodiment of the present disclosure.

FIG. 6B represents a sequence flow diagram 650 of the assignee 108 performing a combined transaction for one or more scheduled transactions at the second transaction terminal 112, in accordance with an example embodiment of the present disclosure. The assignee 108 carries the composite QR code generated for a scheduled transaction (explained with reference to FIG. 4) or two or more scheduled transactions (explained with reference to FIG. 5) to the second transaction terminal 112 (e.g., the merchant terminal 651) for performing the combined transaction.

At 652, the assignee 108 provides at least one biometric data, such as facial features at the merchant terminal 651. For example, the assignee 108 may visit a merchant facility of a merchant associated with the merchant 651 for purchasing goods/services. After purchasing the products/services he/she may walk to the merchant terminal 651 and the merchant terminal 651 may capture facial features of the assignee 108. The merchant terminal 651 may also be an e-commerce merchant store facilitated by the merchant. At 654, the merchant terminal 651 sends the facial features to the acquirer server 116. At 656, the acquirer server 116 forwards the facial features to the issuer server 114 via the payment server 120.

At 658, the issuer server 114 processes the facial features for identifying user account details and retrieving the user account details corresponding to the assignee 108. At 660, the assignee details, for example, the user account details of the assignee 108 and optionally a message confirming the identity of the assignee 108 based on the biometric data is sent to the acquirer server 116 via the payment server 120 which forwards the same to the merchant terminal 651 (see, 662).

At 664, the merchant terminal 651 prompts the assignee 108 to provide a password for authorizing transactions performed by the assignee 108 at the merchant terminal 651. At 666, the assignee 108 may provide the password such as, a graphical code at the merchant terminal 651 via a graphical keypad. At 668, the graphical code is sent to the acquirer server 116. At 670, the acquirer server 116 forwards the graphical code to the payment server 120. At 672, the payment server 120 forwards the graphical code to the issuer server 114. At 674, the issuer server 114 verifies the graphical code to authenticate transactions of the assignee 108 to be performed at the merchant terminal 651.

At 676, the issuer server 114 sends an authentication approval or decline message to the payment server 120. At 678, the payment server 120 forwards the authentication approval or decline message to the acquirer server 116 which forwards the authentication approval or decline message to the merchant terminal 651 (see, 680). At 682, the merchant terminal 651 prompts the assignee 108 to provide the composite QR code. In at least one example embodiment, the merchant terminal 651 determines that a combined transaction of one or more scheduled transactions is linked with the assignee 108 based on the user account details of the assignee 108 and prompts the assignee 108 to provide the composite QR code for the one or more scheduled transactions. Alternatively, the merchant terminal 651 may provide one or more transaction options and the assignee 108 may select a transaction option associated with combined transactions. In one embodiment, when the merchant terminal 651 detects that the assignee 108 intends to perform the combined transactions, the merchant terminal 651 may play a message/display a message requesting the assignee 108 to scan the composite QR code.

At 684, the assignee 108 provides the composite QR code to the merchant terminal 651. At 686, the merchant terminal 651 scans the composite QR code to determine composite QR code data. At 688, the merchant terminal 651 sends the composite QR code data to the acquirer server 116 who forwards it to the payment server 120 (see, 690). At 691, the payment server 120 forwards the composite QR code data captured from the composite QR code to the issuer server 114.

At 692, the issuer server 114 checks the validity of the composite QR code. At 693, the issuer server 114 debits user accounts of respective transaction amount based on the one or more scheduled transactions. At 694, the issuer server 114 releases funds for the combined transaction. The issuer server 114 optionally sends a debit message to the one or more users associated with the one or more scheduled transactions on debit of the transaction amount from respective user accounts based on the composite QR code. At 696 the issuer server 114 sends a transaction approval or decline message to the acquirer server 116. At 697, the acquirer server 116 sends a transaction approval or decline message to the merchant terminal 651.

At 698, the assignee 108 can collect the goods/services availed at the merchant facility associated with the merchant terminal 651.

Figure 7:
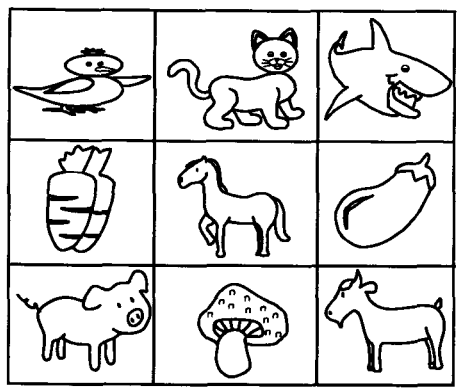
FIG. 7 illustrates a graphical keypad for providing a sequential graphical code at a first transaction terminal and/or second transaction terminal for authenticating a transaction, in accordance with an example embodiment of the present disclosure.

Referring now to FIG. 7, a graphical keypad 700 for providing a sequential graphical code at the first transaction terminal 104 and/or the second transaction terminal 112 for authenticating a transaction is illustrated in accordance with an example embodiment of the present disclosure. The graphical keypad 700, as an example, can be an electronic keypad including a control circuitry that converts key presses into codes. Examples of electronic keypads include optical keypads or capacitive keypads. The graphical keypad 700 may be a physical keypad with soft touch keys or a virtual keypad displayed on a UI of the first transaction terminal 104 and/or the second transaction terminal 112. The virtual keypad may be capable of capturing finger tap inputs, finger gesture inputs, multi-finger tap inputs, multi-finger gesture inputs, or keystroke inputs from a user.

In one example, each key of the graphical keypad 700 may be assigned with an image. Examples of the images on the graphical keypad 700 may include but not limited to animals, trees, birds, fruits, vegetables, and the like. The graphical keypad 700 is configured to assist the user and/or an assignee to provide a password, which is in the form of graphical code, at the first interaction terminal 104 and/or the second transaction terminal 112 for authenticating transactions. In an example, the user may be provided with a graphical code, say of sequence, a goat, a scarecrow, a carrot, and a tractor. During a transaction at the first transaction terminal 104 and/or second transaction terminal 112, the user is prompted by the first transaction terminal 104 and/or second transaction terminal 112 to provide the graphical code for authenticating the transaction. The user provides the graphical code in a correct sequence at the first transaction terminal 104 and/or second transaction terminal 112 via the graphical keypad 700.

Figure 8A:
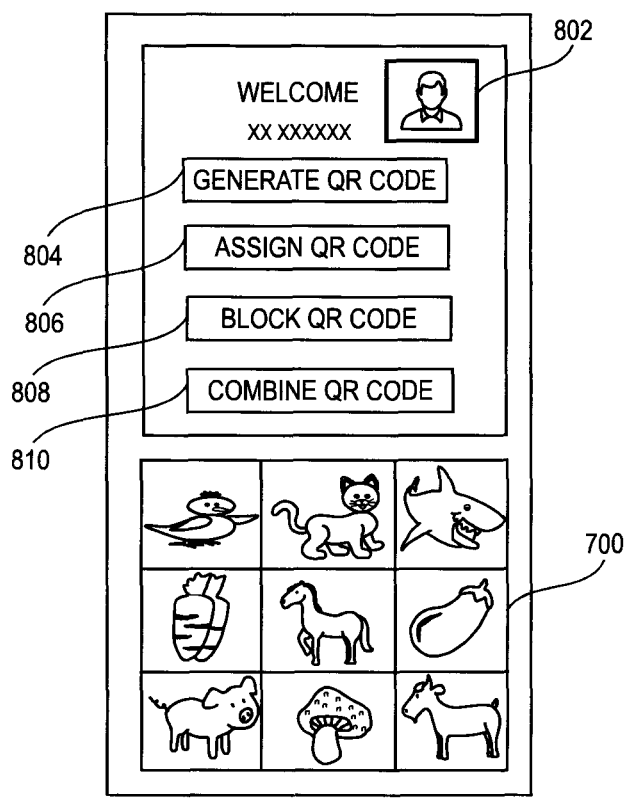
FIG. 8A illustrates a schematic representation of a User Interface (UI) provisioned at the first transaction terminal depicting transaction options for the user, in accordance with an example embodiment of the present disclosure.

Referring now to FIG. 8A, a schematic representation of a User Interface (UI) 800 provisioned at the first transaction terminal 104 depicting transaction options for the user is illustrated in accordance with an example embodiment of the present disclosure.

The first transaction terminal 104 is further configured with the graphical keypad 700. In one example, the graphical keypad 700 may be configured to assist a user to input a password for authenticating a transaction. One example construction of the graphical keypad 700 is described with reference to FIG. 7.

The UI 800 includes a welcome text for the user and an image 802 corresponding to the user may be displayed in the UI 800 along with a username of the user. In an example, the first transaction terminal 104 may capture biometric data, for example, facial features when the user walks to the first transaction terminal 104 for performing a transaction. The facial features may be used to establish an identity of the user and retrieve user account details of the user. The first transaction terminal 104 may further authenticate the user by means of one or more authentication techniques such as biometric data and/or graphical code. When the user is authenticated, the UI 800 may be displayed to the user.

The UI 800 may display a plurality of options for the user to perform at least a part of the transaction at the first transaction terminal 104. For example, the UI 800 may include an option 804 associated with text "GENERATE QR CODE", an option 806 associated with text "ASSIGN QR CODE", an option 808 associated with text "BLOCK QR CODE" and an option 810 associated with text "COMBINE QR CODE". The user may use the option 804 for generating a QR code for a scheduled transaction. As explained with reference to FIGS. 2 to 6, the user may generate the QR code for (1) performing the scheduled transaction at the second transaction terminal 112 using the QR code, (2) assigning the QR code to the assignee 108, or (3) combine the QR code with other QR codes for two or more scheduled transactions to perform a combined transaction at the second transaction terminal 112. When the user provides a selection input on the option 804, the user may be prompted to provide transaction amount for the scheduled transaction. The first transaction terminal 104 then combines the transaction amount along with user account details of the user to generate the QR code for the scheduled transaction.

The option 806 enables the user to assign the QR code to an authorized person (also referred to as "an assignee"). If the user may not be able to perform the scheduled transaction, he/she may authorize the assignee to perform the scheduled transaction at the second transaction terminal 112. When the user provides a selection input on the option 806, the first transaction terminal 104 prompts the user to provide the QR code generated earlier and at least one authentication attribute of the assignee.

The user may provide a selection input on the option 808 if the user intends to block usage of the QR code that was generated earlier by the first transaction terminal 104. The option 810 provides an option for users of the first transaction terminal 104 to combine one or more scheduled transactions to a combined transaction by combining one or more QR codes associated with the one or more scheduled transactions. When the user provides a selection input on the option 810, the first transaction terminal 104 prompts the user to provide the QR codes. It shall be noted that the users associated with the one or more QR codes for the one or more scheduled transactions need to authenticate the generation of a composite QR code for a combined transaction from the one or more QR codes prior to assigning the one or more QR codes to the assignee.

In one example, in addition to the above options, the UI 800 may be further configured with options such as but not limited to 'CHECK TRANSACTION AMOUNT' and 'CHANGE TRANSACTION AMOUNT' (not shown in the FIG. 8A). In an example, the user can check the transaction amount provided for the scheduled transaction by selecting the option associated with text 'CHECK TRANSACTION AMOUNT'. The user may be prompted to either display QR code from which the transaction amount is determined or upon verifying the user, the first transaction terminal 104 may identify a scheduled transaction of the user and provide details of the transaction amount. The user can change the transaction amount for the scheduled transaction by selecting the option associated with text 'CHANGE TRANSACTION AMOUNT'. It shall be noted that the UI 800 may include fewer or more options than those depicted on FIG. 8A and the options shown in FIG. 8A are for exemplary purposes only.

Figure 8B:
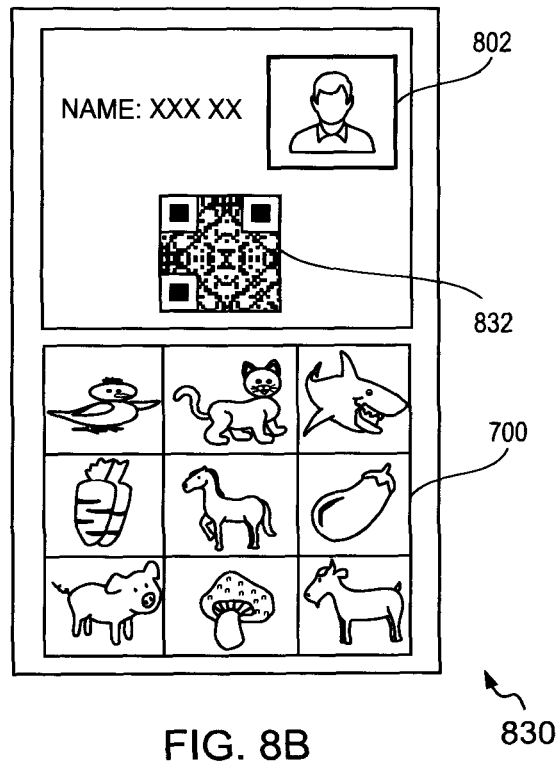
FIG. 8B illustrates a schematic representation of a UI depicting a QR code generated for a scheduled transaction of a user at a first transaction terminal, in accordance with an example embodiment of the present disclosure.

FIG. 8B illustrates a schematic representation of a UI 830 depicting a QR code 832 generated for a scheduled transaction of the user at the first transaction terminal 104, in accordance with an example embodiment of the present disclosure. The UI 830 is displayed to the user when he/she provides a selection input on the option 804 of the UI 800.

The user may be requested to provide a transaction amount for the scheduled transaction. It shall be noted that operations such as, retrieving the user account details and authentication of the user are performed prior and have not been explained herein for the sake of brevity. The first transaction terminal 104 may use the user account details and the transaction amount to generate the QR code 832 for the scheduled transaction. The QR code 832 may either be printed on a piece of paper or sent to a user device of the user.

Figure 8C:
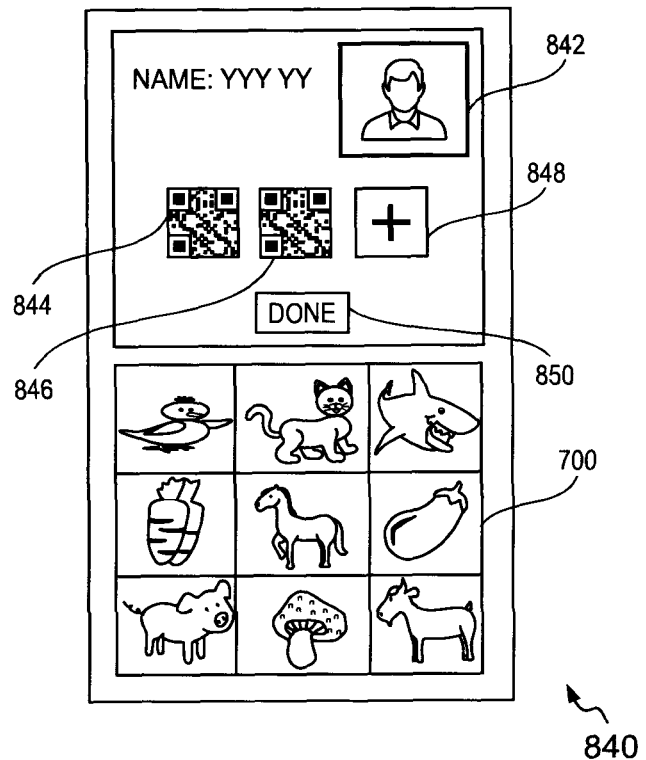
FIG. 8C illustrates a schematic representation of a UI depicting scanning of multiple QR codes at a first transaction terminal for generating the composite QR code, in accordance with an example embodiment of the present disclosure.

Referring now to FIG. 8C, a schematic representation of a UI 840 depicting scanning of multiple QR codes at the first transaction terminal 104 for generating a composite QR code is illustrated in accordance with an example embodiment of the present disclosure. The UI 840 may be presented to the user (also referred to as 'the assignee') when the user provides a selection input on the option 810 of the UI 800. In one example, the assignee collects the QR codes that were individually assigned to him so as to generate the composite QR code. Alternatively, multiple QR codes associated with multiple scheduled transactions are provided at the first transaction terminal 104 after the users associated with the multiple scheduled transactions authenticate themselves individually and authorize the assignee to perform the scheduled transaction on behalf of them at the second transaction terminal 112.

The UI 840 displays an image 842 of the assignee upon retrieving user account details and authenticating the assignee. The username of the assignee may appear beside the image 842. The UI 840 further includes QR codes 844, 846 that have been scanned by the first transaction terminal 104 prior for generating a combined transaction of one or more scheduled transactions. The UI 840 includes an add tab 848 beside the QR code 846. The user may provide a selection input on the add tab 848 to scan more such QR codes for generating a composite QR code for the combined transaction. The UI 840 further includes a tab 850 associated with text "DONE". The user can provide a selection input on the tab 850 when he/she has scanned and uploaded all the QR codes corresponding to the one or more scheduled transactions for generating the composite QR code for the combined transaction.

Figure 8D:
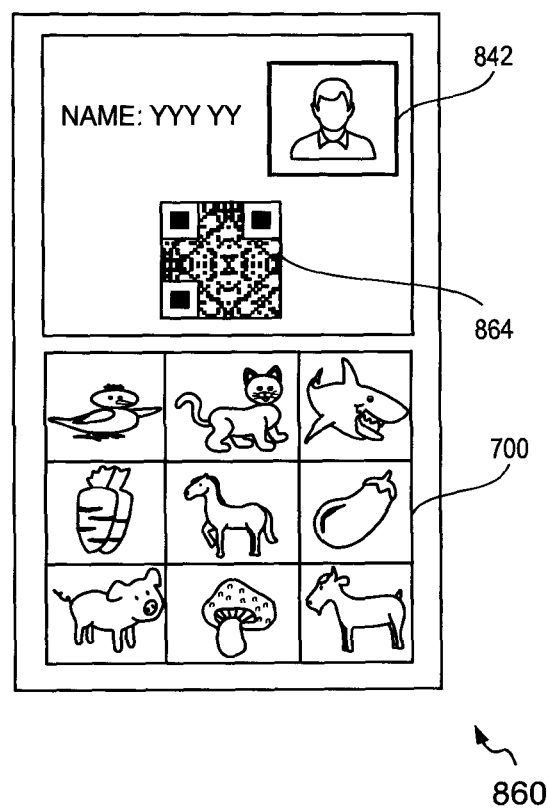
FIG. 8D illustrates a schematic representation of a UI depicting the composite QR code generated at the first transaction terminal for the combined transaction of one or more scheduled transactions, in accordance with an example embodiment of the present disclosure.

The composite code 864 generated in response to a request to combine the one or more QR codes of the one or more scheduled transactions of the UI 860 is shown in FIG. 8D. For example, when the user clicks on the tab 850, the first transaction terminal 104 generates the composite QR code 864 as shown in the UI 860. The UI 860 optionally includes username and the image 842 of the assignee.

Figure 9:
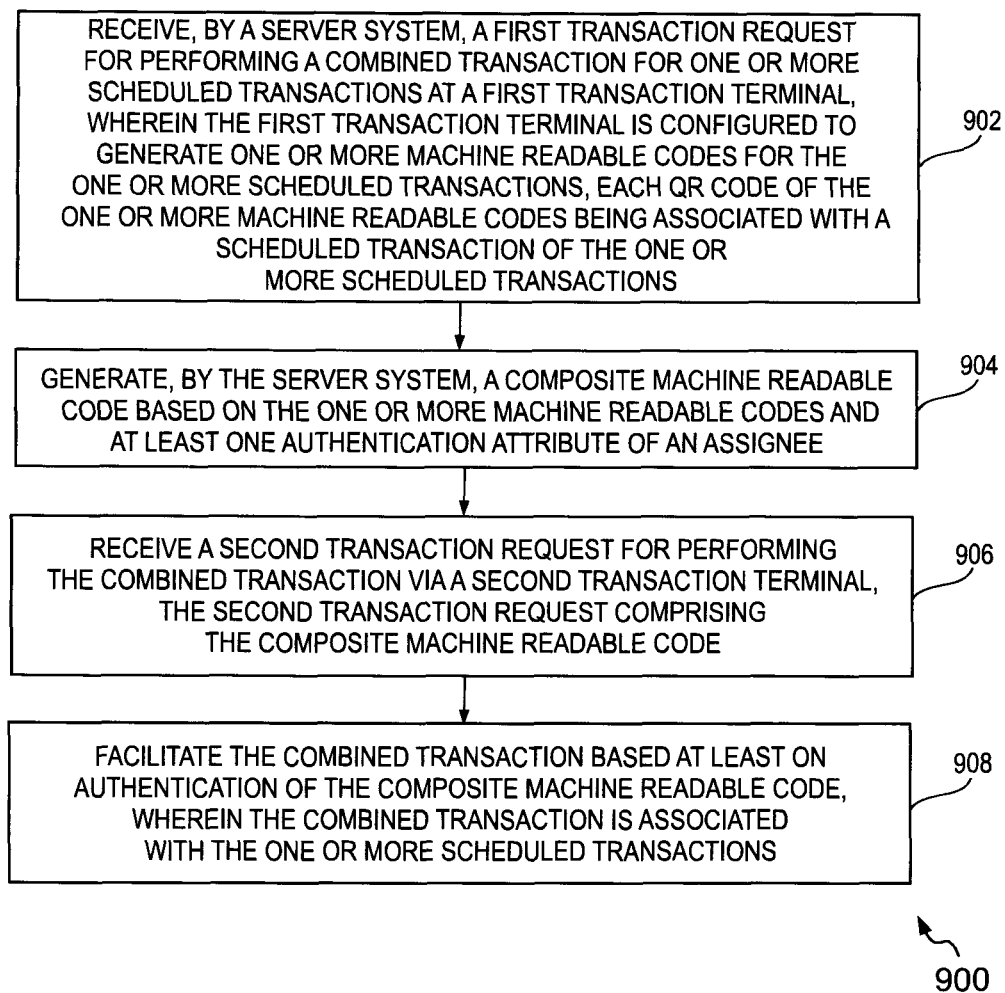
FIG. 9 illustrates a flow diagram of method for processing a combined transaction at the second transaction terminal in response to a composite machine readable code generated at a first transaction terminal, in accordance with an example embodiment of the present disclosure.

Referring now to FIG. 9, a flow diagram of a method 900 for processing a combined transaction at the second transaction terminal 112 in response to a composite machine readable code generated at the first transaction terminal 104 is illustrated in accordance with an example embodiment of the present disclosure. Operations of the flow diagram, and combinations of operation in the flow diagram, may be implemented by, for example, hardware, firmware, a processor, circuitry, and/or a different device associated with the execution of software that includes one or more computer program instructions. The operations of the method 900 are described herein with help of the issuer server 114. It is noted that the operations of the method 900 can be described and/or practiced by using a server system other than the issuer server 114 such as, the acquirer server 116 or the payment server 120. The method 900 starts at operation 902.

At operation 902, the method 900 includes receiving, by a server system, a first transaction request for performing a combined transaction for one or more scheduled transactions at a first transaction terminal. The first transaction terminal is configured to generate one or more machine readable codes for the one or more scheduled transactions. Each machine readable code of the one or more machine readable codes is associated with a scheduled transaction of the one or more scheduled transactions. For instance, users U1, U2, and U3 intend to perform a transaction, for example, withdrawal at the second transaction terminal 112. The users U1, U2, and U3 visit a local terminal i.e. the first transaction terminal installed nearby to generate machine readable codes for their respective transactions. The first transaction terminal provisions options for cardless transactions and hence, the users U1, U2, and U3 are identified based on respective biometric data. The user account details are retrieved based on the biometric data and the users are further authenticated using other authentication options such as, password and various biometric data. In an example, the user U1 can provide a transaction amount A1 for scheduled transaction (T1) and the first transaction terminal generates a machine readable code, for example, a QR code (Q1) for the scheduled transaction (T1). Similarly, the first transaction terminal generates QR codes Q2, Q3 for scheduled transactions S2, S3 of the users U2, U3 for transaction amounts of A2, A3, respectively. It shall be noted that the QR codes Q1, Q2, Q3 are generated sequentially in response to initiation of the scheduled transactions S1, S2, S3. As an example, the QR code (Q1) includes user account details of the user U1, validity of the QR code Q1 and the transaction amount A1 for the scheduled transaction S1. In an example, users U1, U2 are unable to visit the second transaction terminal. Hence, the users U1, U2 may intend to authorize the user U3 (also referred to as 'assignee') to perform the scheduled transaction on behalf of the users U1, U2. In one example, the users U1, U2 and/or assignee U3 may place a first transaction request for combining one or more scheduled transactions. For instance, the users U1, U2 authorize the user U3 to be the assignee for the scheduled transactions S1, S2. The assignee U3 may also choose to combine the scheduled transactions S1, S2 along with his scheduled transaction S3. The first transaction request includes the QR codes Q1, Q2, Q3 and an authentication attribute of the assignee. The authentication attribute may be at least one biometric data and/or a graphical code.

At operation 904, the method 900 includes generating, by the server system, a composite machine readable code based on the one or more machine readable codes and at least one authentication attribute of an assignee. The server system receives the first transaction request and generates the composite machine readable code, such as, a composite QR code (C1) for a combined transaction at the second transaction terminal. The composite QR code C1 includes user account details of the users U1, U2, U3, transaction amounts A1, A2, A3 for the scheduled transactions S1, S2, S3, validity (V1, V2, V3) for the scheduled transactions S1, S2, S3, respectively, and at least one biometric data of the assignee (the user U3).

At operation 906, the method 900 includes receiving a second transaction request for performing the combined transaction via a second transaction terminal. The second transaction request includes the composite machine readable code. In at least one example embodiment, identity of the assignee U3 may be established at the second transaction terminal. The assignee U3 may then scan the composite QR code C1 at the second transaction terminal. The second transaction terminal initiates the second transaction request with the composite QR code C1.

At operation 908, the method 900 includes facilitating the combined transaction based at least on authentication of the composite machine readable code. In an embodiment, when identity of the assignee U3 is established, the authentication attribute of the assignee U3 is compared against biometric data received from the assignee U3 at the second transaction terminal. In some embodiments, the second transaction terminal may prompt the user to provide the required authentication attribute. When the assignee authenticates, the combined transaction includes dispensing money associated with the one or more scheduled transactions. The transactions amounts A1, A2, A3 for the scheduled transactions S1, S2, S3 are dispensed at the second transaction terminal.

The sequence of operations of the method 900 need not be necessarily executed in the same order as they are presented. Further, one or more operations may be grouped together and performed in form of a single step, or one operation may have several sub-steps that may be performed in parallel or in sequential manner.

Figure 10:
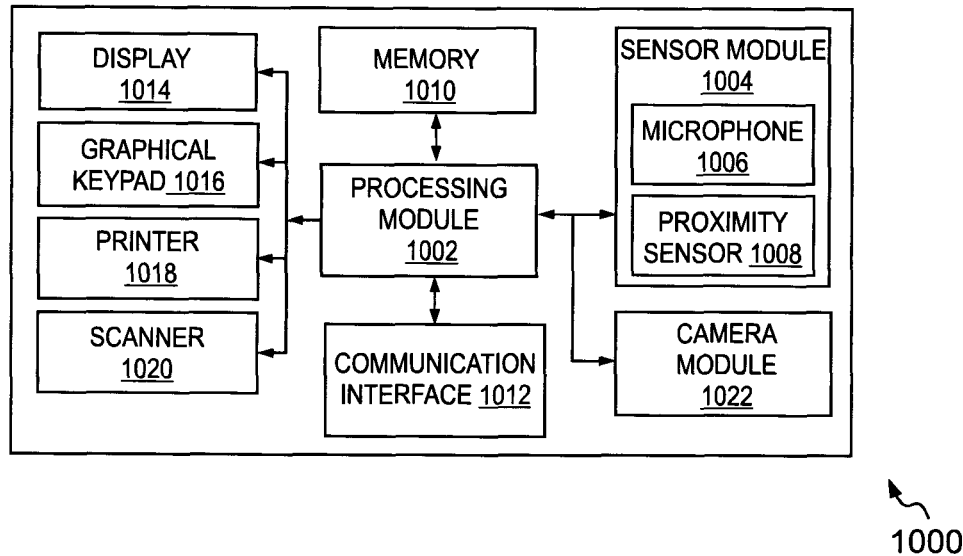
FIG. 10 is a simplified block diagram of a first transaction terminal configured to generate the composite machine readable code, in accordance with one embodiment of the disclosure.

FIG. 10 is a simplified block diagram representing various components of a first transaction terminal 1000, in accordance with one embodiment of the disclosure. The first transaction terminal 1000 is an example of the first transaction terminal 104 that is in communication with a server system such as the issuer server 114 and/or the second transaction terminal 112 (depicted in FIG. 1). It should be understood that the first transaction terminal 1000 as illustrated and hereinafter described is merely illustrative of one type of system and should not be taken to limit the scope of the embodiments. As such, it should be appreciated that at least some of the components described below in connection with that of the first transaction terminal 1000 may be optional and thus in an example embodiment may include more, less or different components than those described in connection with the example embodiment of the FIG. 10.

The first transaction terminal 1000 is configured with at least one processing module 1002, a sensor module 1004, a memory 1010, a communication interface 1012, a display 1014, a graphical keypad 1016, a printer 1018, a scanner 1020, and a camera module 1022. The illustrated first transaction terminal 1000 includes a controller or the processing module 1002 (e.g., a signal processor, microprocessor, ASIC, or other control and processing logic circuitry) for performing such tasks as signal coding, data processing, image processing, input/output processing, power control, and/or other functions.

The processing module 1002 is communicably coupled with the sensor module 1004. The sensor module 1004 includes a microphone 1006 and a proximity sensor 1008. The microphone 1006 is capable of capturing voice input of users for facilitating identification and/or verification of users based on one or more speech features extracted by the processing module 1002. The proximity sensor 1008 is configured to detect objects, for example, users in a close proximity of the first transaction terminal 1000.

The first transaction terminal 1000 includes the memory 1010, for example, a non-removable memory and/or a removable memory. The non-removable memory and/or the removable memory may be collectively known as database in an embodiment. The non-removable memory can include RAM, ROM, flash memory, a hard disk, or other well-known memory storage technologies. The removable memory can include flash memory, smart cards, or a Subscriber Identity Module (SIM). The memory 1010 is configured to store executable instructions for implementing one or more embodiments of the disclosure described with reference to FIGS. 1-9.

The communication interface 1012 is configured to communicate with remote devices such as, the second transaction terminal 112 and/or the issuer server 114. Further, the communication interface 1012 is configured to receive a request for generating a QR code for performing a scheduled transaction at the second transaction terminal 112 and a first transaction request for generating a composite QR code for a combined transaction.

The first transaction terminal 1000 provisions one or more UIs (see, the UI 800, 830, 840, and 860) for displaying one or more transaction options for the users of the first transaction terminal 1000. The display 1014 may include, but are not limited to, a touch screen/a screen capable of capturing finger tap inputs, finger gesture inputs, multi-finger tap inputs, multi-finger gesture inputs, or keystroke inputs from a virtual keyboard. The graphical keypad 1016 may be a virtual keypad facilitated on the display 1014 or a physical keypad provided for the users to provide a sequential graphical code for authentication. In one example, the graphical keypad 1016 may be configured with buttons representing images of, for example, animals, objects, colors, and the like. Each graphical code assigned to a user will be a unique sequence of the images as the graphical code. Additionally or optionally, the graphical keypad 1016 may also be configured with numbers. In an example, in addition to the graphical code, the issuer server 114 may send an OTP for combined transactions to the assignee and the assignee authenticates the combined transaction by providing the OTP at the first transaction terminal 1000. Additionally or optionally, the graphical keypad 1016 may include one or more keys provisioning options such as, cancel, clear and enter.

The printer 1018 is configured to print QR codes and composite QR codes that embed information such as, user account details, transaction amount, validity of the QR code, and optionally an authentication attribute of an assignee among other information. The scanner 1020 is configured to read a machine-readable encrypted code such as the QR code for generating the composite QR code for a combined transaction. An example of the scanner 1020 is a QR code scanner. The camera module 1022 is, capable of capturing still images and/or video images of users performing a transaction at the first transaction terminal 1000. More specifically, the camera module 1022 is configured to capture facial features of the user and/or the authorized person (assignee). The captured data is processed in the processing module 1002 and further forwarded to the issuer server 114 via the communication interface 1012 for identification, authentication or verification.

Figure 11:
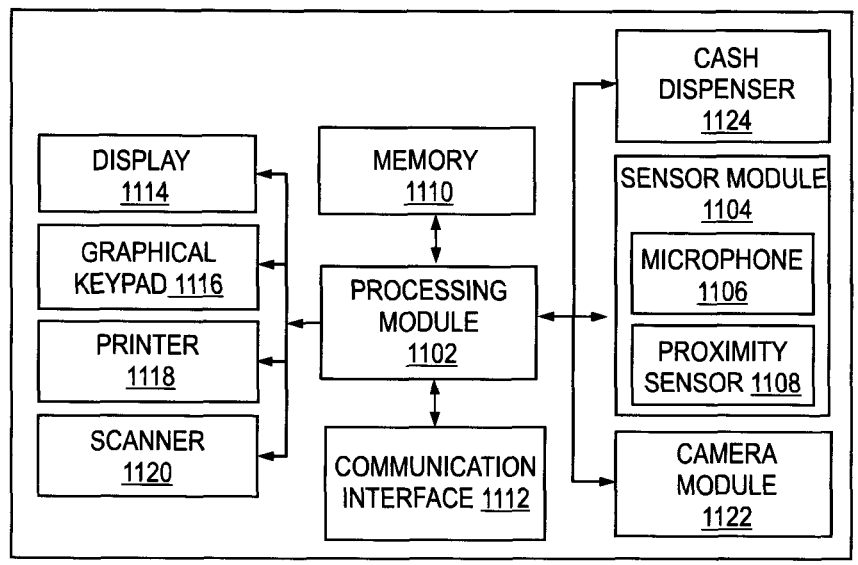
FIG. 11 is a simplified block diagram of a second transaction terminal for processing combined transactions based on the composite machine readable code generated at the first transaction terminal, in accordance with one embodiment of the disclosure.

FIG. 11 is a simplified block diagram representing various components of a second transaction terminal 1100, in accordance with one embodiment of the disclosure. The second transaction terminal 1100 is an example of the second transaction terminal 112 that is in communication with a server system such as the issuer server 114 and/or the first transaction terminal 104 (depicted in FIG. 1). It should be understood that the second transaction terminal 1100 as illustrated and hereinafter described is merely illustrative of one type of device and should not be taken to limit the scope of the embodiments. As such, it should be appreciated that at least some of the components described below in connection with that of the second transaction terminal 1100 may be optional and thus in an example embodiment may include more, less, or different components than those described in connection with the example embodiment of the FIG. 11.

The second transaction terminal 1100 is configured with at least one processing module 1102, the sensor module 1104, the memory 1110, the communication interface 1112, the display 1114, the graphical keypad 1116, the printer 1118, the scanner 1120, the camera module 1122, and a cash dispenser 1124. The sensor module 1104 includes a microphone 1106 and a proximity sensor 1108. The components 1102, 1104, 1106, 1108, 1110, 1114, 1116, 1120, and 1122 have been explained with reference to FIG. 10.

The communication interface 1112 is configured to receive a second transaction request including a composite QR code for a combined transaction. The scanner 1120 reads the composite QR code to determine user account details, validity of the one or more scheduled transactions, transaction amounts of the one or more scheduled transactions, and the authentication attribute of the assignee. The assignee is authenticated using one or more authentication techniques such as, biometric techniques employed on biometric data acquired via the sensor module 1104 and/or the camera module 1122. Upon authenticating identity of the assignee, the processing module 1102 instructs the cash dispenser 1124 to dispense money equivalent to sum of transaction amounts of the one or more scheduled transactions based on the composite QR code to the assignee.

Figure 12:
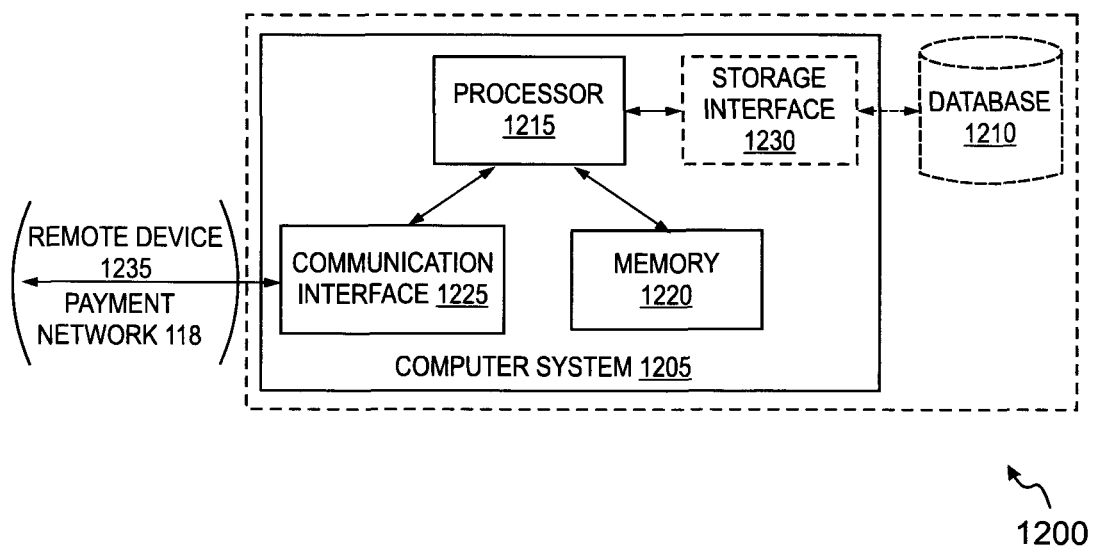
FIG. 12 is a simplified block diagram of a server system used for facilitating the combined transaction, in accordance with one embodiment of the present disclosure.

FIG. 12 is a simplified block diagram of a server system 1200 used for facilitating a combined transaction, in accordance with one embodiment of the present disclosure. The server system 1200 is an example of a server system that is a part of the payment network 118. Examples of the server system 1200 include, but not limited to, the payment server 120, the acquirer server 116, and the issuer server 114. The server system 1200 includes a computer system 1205 and a database 1210.

The computer system 1205 includes at least one processor 1215 for executing instructions. Instructions may be stored in, for example, but not limited to, a memory 1220. The processor 1215 may include one or more processing units (e.g., in a multi-core configuration).

The processor 1215 is operatively coupled to a communication interface 1225 such that the computer system 1205 is capable of communicating with a remote device 1235 such as the first transaction terminal 104 and/or the second transaction terminal 112 or communicating with any entity within the payment network 118. For example, the communication interface 1225 may receive the first transaction request for generating a composite QR code for one or more scheduled transactions. In one embodiment, the communication interface 1225 may receive a second transaction request for processing a combined transaction at the second transaction terminal 112.

The processor 1215 may also be operatively coupled to the database 1210. The database 1210 is any computer-operated hardware suitable for storing and/or retrieving data, such as, but not limited to, customer data such as, user account details and plurality of biometric data including data relating to previous transactions, authorized person, and transaction details. The database 1210 may also store information related to a plurality of user's payment accounts. Each user account data includes at least one of an account holder name, an account holder address, an account number, MPIN, at least one biometric data, a graphical code, and other account identifiers. The database 1210 may also store information of a plurality requests generated by the user such as, but not limited to, cash withdrawal request, QR code generation request, QR code assignment (to the authorized person) request. The database 1210 may include multiple storage units such as hard disks and/or solid-state disks in a redundant array of inexpensive disks (RAID) configuration. The database 1210 may include a storage area network (SAN) and/or a network attached storage (NAS) system.

In some embodiments, the database 1210 is integrated within the computer system 1205. For example, the computer system 1205 may include one or more hard disk drives such as the database 1210. In other embodiments, the database 1210 is external to the computer system 1205 and may be accessed by the computer system 1205 using a storage interface 1230. The storage interface 1230 is any component capable of providing the processor 1215 with access to the database 1210. The storage interface 1230 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1215 with access to the database 1210.

The processor 1215 is configured to facilitate cardless accessing of the user account remotely. The processor 1215 is configured to perform one or more of the functions such as: receive at least one biometric data from the user and/or the authorized person, process the received biometric data, generate a composite QR code that authorizes the assignee to perform a scheduled transaction on behalf of the user, print the QR code, and process a combined transaction. The processor 1215 is further configured to facilitate the authentication of the user 106 by verifying the biometric data, PIN/OTP, validity of the QR code by accessing respective information from the database 1210.

Figure 13:
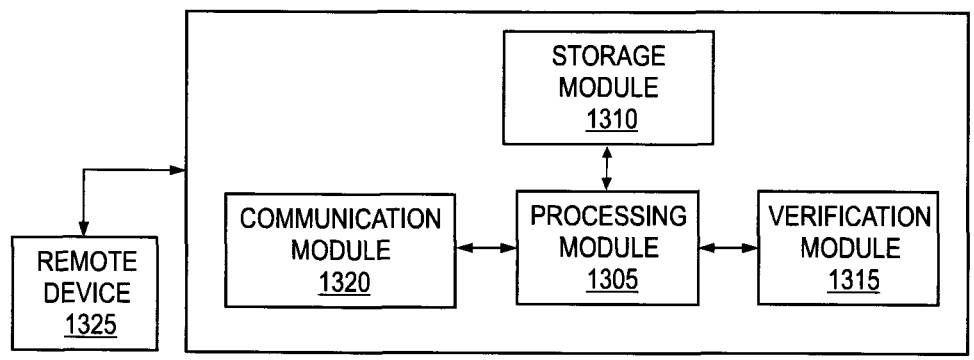
FIG. 13 is a simplified block diagram of an issuer server for facilitating the combined transaction, in accordance with one embodiment of the present disclosure.

FIG. 13 is a simplified block diagram of an issuer server 1300 for facilitating a combined transaction, in accordance with one embodiment of the present disclosure. The issuer server 1300 is an example of the issuer server 114 of FIG. 1 or may be embodied in the issuer server 114. The issuer server 1300 is associated with an issuer bank/issuer, in which a customer may have a user account. The issuer server 1300 includes a processing module 1305 operatively coupled to a storage module 1310, a verification module 1315, and a communication module 1320. The components of the issuer server 1300 provided herein may not be exhaustive and that the issuer server 1300 may include more or fewer components than that of depicted in FIG. 13. Further, two or more components may be embodied in one single component, and/or one component may be configured using multiple sub-components to achieve the desired functionalities. Some components of the issuer server 1300 may be configured using hardware elements, software elements, firmware elements, and/or a combination thereof.

The storage module 1310 is configured to store machine executable instructions to be accessed by the processing module 1305. Additionally, the storage module 1310 stores information related to, contact information of a user and/or assignee, bank account number, availability of funds in the account, biometric data, and other information of the user and/or assignee and/or the like. This information is retrieved by the processing module 1305 for validation during cardless accessing of the user account.

The processing module 1305 is configured to communicate with one or more remote devices such as a remote device 1325 using the communication module 1320 over a network such as the network 110 or the payment network 118 of FIG. 1. The examples of the remote device 1325 include, the first transaction terminal 104, the second transaction terminal 112, the payment server 120, or other computing systems of the issuer server 114 and the payment network 118 and the like. The communication module 1320 is capable of facilitating such operative communication with the remote devices and cloud servers using API (Application Program Interface) calls. The communication module 1320 is further configured to receive a first transaction request for generating a composite QR code. In some example embodiments, the communication module 1320 receives the second transaction request for processing the combined transaction based on the composite QR code.

Figure 14:
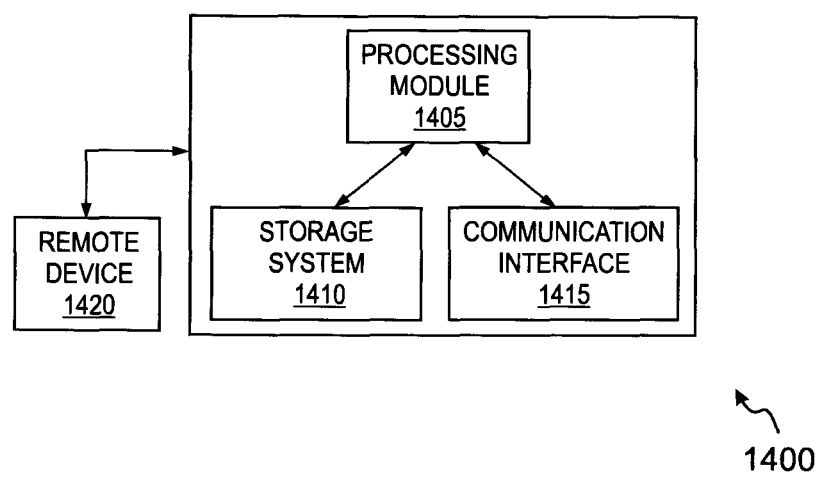
FIG. 14 is a simplified block diagram of a payment server for facilitating the combined transaction, in accordance with one embodiment of the present disclosure.

FIG. 14 is a simplified block diagram of a payment server 1400 for facilitating a combined transaction, in accordance with one embodiment of the present disclosure. The payment server 1400 may correspond to the payment server 120 of FIG. 1. As explained with reference to FIG. 1, the payment server 120 is associated with the payment network 118. The payment network 118 may be used by the issuer server 114 and the acquirer server 116 as a payment interchange network. Examples of payment interchange network include, but not limited to, Mastercard® payment system interchange network. The payment server 1400 includes a processing module 1405 configured to extract programming instructions from a storage system 1410 to provide various features of the present disclosure. Via a communication interface 1415, the processing module 1405 is connected to a remote device 1420 such as the issuer server 114 and the acquirer server 116. The components of the payment server 1400 provided herein may not be exhaustive, and that the payment server 1400 may include more or fewer components than that of depicted in FIG. 14. Further, two or more components may be embodied in one single component, and/or one component may be configured using multiple sub-components to achieve the desired functionalities. Some components of the payment server 1400 may be configured using hardware elements, software elements, firmware elements, and/or a combination thereof.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1200 (e.g., the servers 114, 116, and 118) and its various components such as the computer system 1205 and the database 1210 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Without in any way limiting the scope, interpretation, or application of the claims appearing below, a technical effect of one or more of the example embodiments disclosed herein is to provide methods and systems for performing a combined transaction at an ATM interface. More specifically, rural users can perform at least a part of their transaction at a local terminal (referred to as 'the first transaction terminal') and thereby authorize an assignee to perform remaining part of the scheduled transaction at the second transaction terminal (referred to as 'ATM interface') in a more secure manner. The users can authenticate the scheduled transaction and thereby preclude sharing of credentials such as, password, user account details with the assignee.

Various embodiments of the present disclosure provide methods for combining one or more scheduled transactions. Combining of the one or more scheduled transactions spares the assignee the hassle of carrying multiple QR codes and performing individual transaction for each of the one or more scheduled transactions. Moreover, the local terminal and the ATM interface are configured to process cardless transactions. Therefore, the terminals (local terminal and the ATM interface) are adapted to facilitate cardless transactions using alternate mechanisms such as, identifying, authenticating and verifying users based on various biometric data. Further, the numeric PIN for authenticating transactions is replaced by graphical codes/images that may be easier for a rural user to remember and recollect. Furthermore, the terminals ensure ease of using the terminals by communicating with users in regional language/preferred language.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method comprising:
    receiving, by a server system, a first transaction request for performing a combined transaction including one or more scheduled transactions initiated at a first transaction terminal by a first user, wherein the first transaction terminal is in remote communication with a second transaction terminal for completing the combined transaction, and wherein the first transaction terminal is configured to:
        generate one or more machine readable codes for the one or more scheduled transactions, each machine readable code of the one or more machine readable codes including data associated with the first user and a scheduled transaction of the one or more scheduled transactions;
    generating, by the server system, a composite machine readable code by combining the one or more machine readable codes received in the first transaction request and at least one authentication attribute of a second user authorized by the first user to conduct the combined transaction at the second transaction terminal, the at least one authentication attribute for authenticating the second user;
    transmitting, by the server system, the composite machine readable code to the first transaction terminal;
    causing the first transaction terminal to print the composite machine readable code, wherein the first transaction terminal is incapable of dispensing money for the one or more scheduled transactions;
    receiving a second transaction request for performing the combined transaction via the second transaction terminal, wherein the second transaction terminal scans the printed composite machine readable code and receives authentication data of the second user to (a) authenticate the second user by comparing the at least one authentication attribute in the scanned composite machine readable code to the received authentication data, and (b) generate the second transaction request in response to authenticating the second user, wherein the second transaction terminal is one of (i) an automated teller machine (ATM) configured to perform one or more ATM transactions for the combined transaction, and (ii) a merchant terminal configured to perform one or more merchant transactions for the combined transaction, and wherein the second transaction request comprises the composite machine readable code; and
    transmitting, by the server system, instructions to the second transaction terminal to complete the combined transaction after the server system authenticates the composite machine readable code, wherein the instructions cause the second transaction terminal to perform the one or more ATM transactions when the second transaction terminal is a remote ATM, and wherein the instructions cause the second transaction terminal to perform the one or more merchant transactions when the second transaction terminal is a remote merchant terminal.

2. The method according to claim 1, wherein receiving the first transaction request comprises:
    receiving, by the server system, at least one biometric data from each of the first and second users associated with the one or more scheduled transactions;
    determining, by the server system, respective user accounts of the first and second users based on the at least one biometric data; and
    authenticating the first and second users, wherein authenticating a user of the first and second users comprises:
        receiving, by the server system, a graphical code for authenticating an identity of the user accessing a user account of the user; and
        authenticating, by the server system, the identity of the user by comparing the graphical code with a pre-stored graphical code of the user account.

3. The method according to claim 2, wherein determining the user account of the user comprises:
    comparing, by the server system, the at least one biometric data of the user with a plurality of biometric data, each biometric data of the plurality of biometric data associated with the user account of a plurality of user accounts;
    identifying, by the server system, a biometric data of the plurality of biometric data similar to the at least one biometric data; and
    determining, by the server system, the user account associated with the biometric data.

4. The method according to claim 2, wherein the at least one biometric data is one of:
    one or more facial features;
    an iris pattern;
    a finger print; and
    one or more speech features.

5. The method according to claim 1, wherein generating the composite machine readable code comprises concatenating the one or more machine readable codes and the at least one authentication attribute of the second user.

6. The method according to claim 1, further comprising:
    upon generation of the composite machine readable code, reserving, by the server system, cash corresponding to the combined transaction at the second transaction terminal.

7. The method according to claim 1, wherein the at least one authentication attribute of the second user is at least one of:
account information associated with the second user;
a facial feature of the second user;
an iris pattern of the second user;
a finger print of the second user; and
one or more speech features of the second user.

8. The method according to claim 1, wherein each machine readable code of the one or more machine readable codes for the one or more scheduled transactions includes at least one of:
a transaction amount;
a validity of the machine readable code;
identity of a user; and
user account details.

9. The method according to claim 1, wherein receiving the second transaction request comprises:
receiving, by the server system, at least one biometric data of the second user for the combined transaction;
determining, by the server system, a user account of the second user based on the at least one biometric data of the second user;
receiving, by the server system, a graphical code for authenticating identity of the second user; and
authenticating, by the server system, the identity of the second user by comparing the graphical code with a pre-stored graphical code of the user account.

10. The method according to claim 9, further comprising:
reading, by the server system, the composite machine readable code for retrieving transaction information related to the one or more scheduled transactions; and
determining, by the server system, a validity of the composite machine readable code by checking an expiry of the composite machine readable code.

11. The method according to claim 1, wherein causing the second transaction terminal to perform the one or more ATM transactions for the combined transaction further comprises at least one of dispensing money from a user account of the first user, supplying an account balance of the user account, or depositing money into the user account at the ATM, and wherein causing the second transaction terminal to perform the one or more merchant transactions further comprises purchasing, using the user account, one or more goods associated with the one or more scheduled transactions from the merchant terminal.

12. A server system comprising:
a memory comprising stored computer-executable instructions; and
at least one processor configured to execute the stored computer-executable instructions to cause the server system to perform at least:
receiving a first transaction request for performing a combined transaction including one or more scheduled transactions initiated at a first transaction terminal by a first user, wherein the first transaction terminal is in remote communication with a second transaction terminal for completing the combined transaction, and wherein the first transaction terminal is configured to:
generate one or more machine readable codes for the one or more scheduled transactions, each machine readable code of the one or more machine readable codes including data associated with the first user and a scheduled transaction of the one or more scheduled transactions;
generating a composite machine readable code by combining the one or more machine readable codes received in the first transaction request and at least one authentication attribute of a second user authorized by the first user to conduct the combined transaction at the second transaction terminal, the at least one authentication attribute for authenticating the second user;
transmitting, by the server system, the composite machine readable code to the first transaction terminal;
causing the first transaction terminal to print the composite machine readable code, wherein the first transaction terminal is incapable of dispensing money for the one or more scheduled transactions;
receiving a second transaction request for performing the combined transaction via the second transaction terminal, wherein the second transaction terminal scans the printed composite machine readable code and receives authentication data of the second user to (a) authenticate the second user by comparing the at least one authentication attribute in the scanned composite machine readable code to the received authentication data, and (b) generate the second transaction request in response to authenticating the second user, wherein the second transaction terminal is one of (i) an automated teller machine (ATM) configured to perform one or more ATM transactions for the combined transaction and (ii) a merchant terminal configured to perform one or more merchant transactions for the combined transaction, and wherein the second transaction request comprises the composite machine readable code; and
transmitting instructions to the second transaction terminal to complete the combined transaction after the server system authenticates the composite machine readable code, wherein the instructions cause the second transaction terminal to perform the one or more ATM transactions when the second transaction terminal is a remote ATM, and wherein the instructions cause the second transaction terminal to perform the one or more merchant transactions when the second transaction terminal is a remote merchant terminal.

13. The server system according to claim 12, wherein for receiving the first transaction request, the server system is caused to perform:
receiving at least one biometric data from each of the first and second users associated with the one or more scheduled transactions;
determining respective user accounts of the first and second users based on the at least one biometric data; and
authenticating the first and second users, wherein authenticating a user of the first and second users comprises:
receiving a graphical code for authenticating an identity of the user accessing a user account of the user; and
authenticating the identity of the user by comparing the graphical code with a pre-stored graphical code of the user account.

14. The server system according to claim 12, wherein for receiving the second transaction request, the server system is caused to perform:
receiving at least one biometric data of the second user for the combined transaction;
determining a user account of the second user based on the at least one biometric data of the second user;

receiving a graphical code for authenticating identity of the second user; and authenticating the identity of the second user by comparing the graphical code with a pre-stored graphical code of the user account.

15. The server system according to claim 14, wherein the server system is further caused to perform:

reading the composite machine readable code for retrieving transaction information related to the one or more scheduled transactions; and determining a validity of the composite machine readable code by checking an expiry of the composite machine readable code.

16. A first transaction terminal comprising:

a database for storing executable instructions;

a communication interface configured to receive a first transaction request for performing a combined transaction including one or more scheduled transactions initiated at the first transaction terminal by a first user, wherein the first transaction terminal is in remote communication with a second transaction terminal for completing the combined transaction, and is incapable of dispensing money for the one or more scheduled transactions; and a processing module electronically coupled to the communication interface and the database, the processing module configured to execute the executable instructions to perform at least:

generating one or more machine readable codes for the one or more scheduled transactions, each machine readable code of the one or more machine readable codes including data associated with the first user and a scheduled transaction of the one or more scheduled transactions;

generating a composite machine readable code by combining the one or more machine readable codes and at least one authentication attribute of a second user authorized by the first user to conduct the combined transaction at the second transaction terminal, the at least one authentication attribute for authenticating the second user; and printing the composite machine readable code, wherein the composite machine readable code is configured to perform the combined transaction at the second transaction terminal, and wherein each of the one or more scheduled transactions is an automated teller machine (ATM) transaction when the second transaction terminal is an ATM, and wherein each of the one or more scheduled transactions is a merchant transaction when the second transaction terminal is a merchant terminal.

17. The first transaction terminal according to claim 16, further comprising:

a sensor module comprising one or more sensors in operative communication with the processing module, the sensor module configured to receive at least one biometric data from at least one of the first and second users for the combined transaction, wherein a biometric data is one of one or more facial features, an iris pattern, a finger print, and one or more speech features.

18. The first transaction terminal according to claim 16, further comprising a graphical keypad in operative communication with the processing module, the graphical keypad configured to receive a graphical code for authenticating identity of a user accessing a user account.

* * * * *